(12) United States Patent
Perotti

(10) Patent No.: US 11,712,934 B2
(45) Date of Patent: Aug. 1, 2023

(54) ALIGNING HITCH PIN ASSEMBLY

(71) Applicant: etrailer Corporation, Wentzville, MO (US)

(72) Inventor: Daniel Perotti, St. Charles, MO (US)

(73) Assignee: ETRAILER CORPORATION, Wentzville, MO (US)

( * ) Notice: Subject to any disclaimer, the term of this patent is extended or adjusted under 35 U.S.C. 154(b) by 585 days.

(21) Appl. No.: 16/862,092

(22) Filed: Apr. 29, 2020

(65) Prior Publication Data

US 2021/0339586 A1 Nov. 4, 2021

(51) Int. Cl.
| | |
|---|---|
| B60D 1/28 | (2006.01) |
| B60D 1/52 | (2006.01) |
| B60D 1/06 | (2006.01) |
| B60R 9/06 | (2006.01) |
| B60R 9/10 | (2006.01) |

(52) U.S. Cl.
CPC ............... B60D 1/28 (2013.01); B60D 1/52 (2013.01); *B60D 1/06* (2013.01); *B60R 9/06* (2013.01); *B60R 9/10* (2013.01)

(58) Field of Classification Search
CPC ... B60D 1/28; B60D 1/52; B60D 1/06; B60D 1/60; B60R 9/06; B60R 9/10
See application file for complete search history.

(56) References Cited

U.S. PATENT DOCUMENTS

| | | | |
|---|---|---|---|
| 3,604,304 A * | 9/1971 | Botting | F16B 5/0642 411/343 |
| 6,039,228 A | 3/2000 | Stein et al. | |
| 6,193,261 B1 * | 2/2001 | Hahka | B60D 1/02 24/453 |
| 6,334,561 B1 | 1/2002 | Cole | |
| 6,409,203 B1 | 6/2002 | Williams | |
| 6,533,308 B1 * | 3/2003 | Tambornino | B60D 1/54 280/901 |
| 6,672,115 B2 | 1/2004 | Wyers | |
| 6,773,200 B2 * | 8/2004 | Cole | B60R 9/06 403/376 |
| 6,945,550 B2 | 9/2005 | Williams | |
| 7,165,426 B2 | 1/2007 | Wyers | |
| 7,600,774 B1 | 10/2009 | Speer et al. | |
| 7,806,425 B2 * | 10/2010 | Chang | B60D 1/52 280/506 |

(Continued)

*Primary Examiner* — Kevin Hurley
*Assistant Examiner* — Marlon A Arce
(74) *Attorney, Agent, or Firm* — Sandberg Phoenix & von Gontard PC

(57) ABSTRACT

A hitch pin assembly includes a hitch pin, housing and shoulder bushing. The housing removably connects to the bushing when the bushing is seated in the aperture of a receiver tube. When the housing is so connected a plunger of the housing extends through the bushing and projects into the receiver tube. When the shank is inserted into the receiver tube the plunger tip catches the aperture of the shank, holding the shank in a position in which the pin-receiving apertures on the receiver tube and shank are aligned. The hitch pin is then inserted from one side of the receiver tube and into the bushing. A plunger in the housing translates along a projection in a track of the plunger to reveal the projection to the hitch pin tip and place it into position for engagement with the inserted hitch pin. The engagement holds the shank and eliminates rattling.

16 Claims, 34 Drawing Sheets

(56) References Cited

U.S. PATENT DOCUMENTS

| | | | |
|---|---|---|---|
| 8,079,613 B2 | 12/2011 | Williams | |
| 8,302,435 B2 * | 11/2012 | Burmesch | B60D 1/02 70/34 |
| 9,616,723 B2 | 4/2017 | Okerlund | |
| 2003/0210952 A1 * | 11/2003 | Hsiao | F16B 21/10 403/322.4 |
| 2004/0139771 A1 | 7/2004 | Wyers | |
| 2005/0236811 A1 | 10/2005 | Williams | |
| 2019/0168552 A1 | 6/2019 | Edwards | |

* cited by examiner

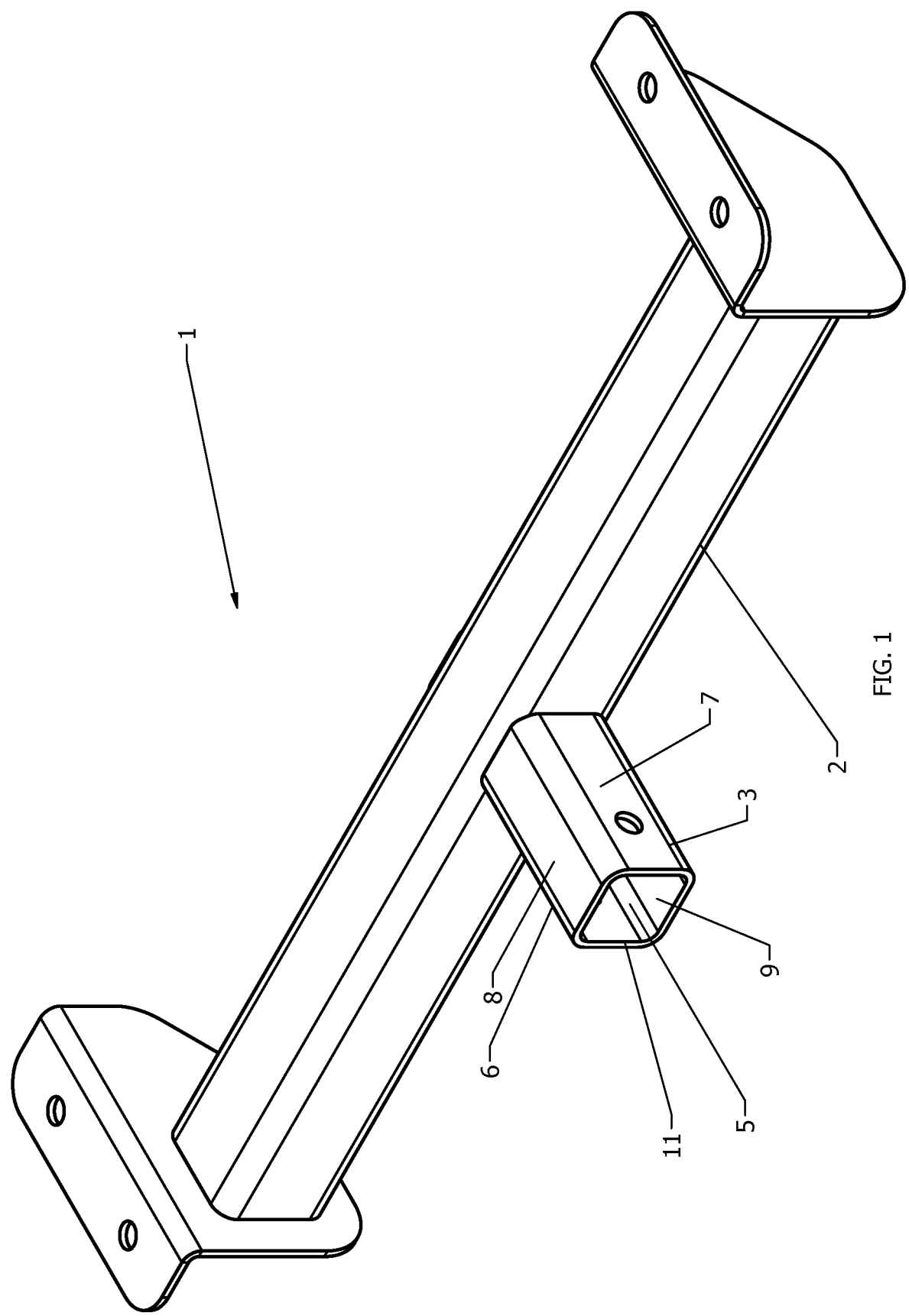

ALIGNING HITCH PIN ASSEMBLY

CROSS REFERENCE TO RELATED APPLICATION

Not applicable.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to the field of receiver hitch assemblies and particularly to the field of mechanisms for connecting the shank of an accessory device to a receiver tube.

BACKGROUND OF THE INVENTION

Passenger vehicles and pick-up trucks commonly include rear mounted receiver hitch assemblies either as factory-installed equipment or as an after-market add-on. These receiver hitches are used for many purposes including the towing of such items as other vehicles, lawn equipment trailers, flat-bed trailers, enclosed trailers, camping trailers and horse trailers. They are also used as an attachment point to attach devices with specific carrying purposes such as bicycle carriers, cargo carriers and wheel chair carriers.

The commonly used receiver hitch assembly is composed of several main parts, including a receiver tube attached to a frame that mounts to the underside of a motor vehicle. The receiver tube and frame are made of robust steel. The receiver tube has a square cross section made by four adjoining walls that define an interior cavity. The interior cavity has a dimension and shape designed to receive a particularly sized shank that is attached to an accessory device. The receiver tube telescopically receives the shank through an opening in the receiver tube. One common accessory device that connects to a shank adapted for insertion into the receiver tube is a ball mount of the common drawbar used for towing. Bicycle carriers and cargo carriers are non-limiting examples of other accessory devices that include a shank for insertion and retention in a receiver tube.

The interior dimensions of the cross section of the receiver tube may be one of a variety of commonly used sizes. The size is typically selected based upon the towing ability of the vehicle to which the hitch receiver assembly is mounted and the intended towing usages of the user. In this respect, for most consumer and commercial applications, hitch receiver assemblies come with square receiver tubes with interior wall lengths of either 1¼ inches or 2 inches, though currently more receivers with 3-inch tubes are being utilized. Regardless of the accessory device attached to the shank, the shank has outer dimensions slightly smaller than the internal dimensions of the receiver tube. It too has a square cross sectional shape defined by four walls. When attaching the shank to the receiver tube, the shank is slidably inserted into the opening of the receiver tube such that the shank and receiver tube move relatively in telescoping fashion. The relative dimensions of the receiver tube and shank permit the shank to be telescopically inserted into, positioned inside of and removed from the receiver tube. The shank may be solid or it may be hollow.

Both the shank and the receiver tube include opposing apertures on their side walls. These apertures are used to hold the shank within the receiver tube. In the most common attachment method, the shank is inserted into the receiver tube and the opposing apertures of the shank are aligned with the opposing apertures of the receiver tube. For sake of brevity, this alignment of apertures between the shank and receiver tube is referred to as the "aligned configuration." Once the apertures are in the aligned configuration, a pin (a/k/a "hitch pin") is inserted through the four apertures. The pin has a leading end that is pushed through the aligned apertures. The opposing end of the pin is either bent or enlarged to prevent through-passage through the aligned apertures. Once in place, the pin prevents further significant telescopic (longitudinal) movement of the shank within the receiver tube. A cotter pin (or in other cases, a clip or lock) is then affixed to the leading end of the pin to prevent the pin from sliding back out from the aligned apertures.

End users note a variety of deficits with connecting the shank of accessory devices to receiver tubes using existing devices. This is particularly so in the case where the user is mounting a bulky accessory device such as a bike carrier or a cargo carrier. When the shank is a projection on a heavy and unwieldy accessory device such as a bike rack or cargo carrier, aligning the shank with the receiver tube so that they can be initially engaged is a difficult task for many people.

Once the leading end of the shank is inserted into the opening of the receiver tube, the difficulties in installing the desired accessory device are not over. In this regard, another particular issue is putting the apertures of the shank in the aligned configuration with those of the receiver tube. This is because the shank does not slide smoothly inside the receiver tube as both are typically made from a coarse steel and the shank and receiver tube are designed such that the apertures can slide past each other, both forwardly and rearwardly. Of note, there is no structure inside the receiver tube that will stop the inserted shank at the proper position to align the hitch pin apertures. Also, because of the weight and imbalance of the device sought to be attached to the hitch receiver assembly, the leading end of the shank angles up relative to the opposing end of the shank affixed to the device end. Thus, there is often a large amount of friction between the interior surfaces of the receiver tube and the exterior surfaces of the shank. By virtue of these features, the process of aligning the apertures of the shank with those of the receiver tube can be a painstaking and physically demanding process of sliding the entire accessory device back and forth to telescopically move the shank in the receiver tube.

Another deficit found in prior art systems and methods used for connecting the shank of an accessory device to a receiver tube is the noisy rattling of the mounted accessory device while driving the vehicle. This rattling results from the fact that the cross sectional dimensions of the shank are reduced from the interior dimensions of the receiver tube in order to facilitate telescopic movement of the shank in the receiver tube. However, this cross sectional difference between the two structures causes relative transverse movement between the receiver tube and the shank. In addition, the apertures in the side walls of the shank and the apertures of the receiver tube have diameters that are oversized in comparison to the diameter of a standard hitch pin. The apertures of the shank may also differ in size from the apertures of the receiver tube. Because of these size differences, there is sufficient play (both transverse and longitudinal) among the secured devices that causes noisy rattling while the user is driving his or her motor vehicle.

Though devices have been proposed to eliminate the rattling between the shank and receiver tube, these devices are difficult to employ, do not solve the problem of the aforesaid aperture alignment difficulties and generally do not allow for integration of a reliable locking device that locks the pin to the receiver tube. There is therefore presently a need for a device that will assist in the alignment of the shank apertures with those of the receiver tube, eliminate the rattle between the receiver tube and the shank and effect the locking of the shank to the receiver tube.

SUMMARY OF THE INVENTION

The present invention is broadly directed to a hitch pin assembly along with a method and system of using same. In a first preferred embodiment, the invention is directed to a hitch pin assembly for use with a receiver tube having an interior cavity that is sized and shaped to telescopically receive a shank of an accessory device. As is known in the art, the receiver tube and the shank each have first apertures that oppose second apertures. The first and second apertures are configurable in the aforementioned aligned configuration when the receiver tube telescopically receives the shank. The hitch pin assembly comprises a hitch pin, a housing and a shoulder bushing. The hitch pin has a head and a tip. The housing removably connects to the shoulder bushing when the shoulder bushing is placed into the first aperture of the receiver tube.

When the housing is removably connected to the positioned bushing, a spring-loaded plunger included in the housing extends through a bore of the shoulder bushing and the tip of the plunger projects into the interior cavity of the receiver tube. Upon sliding the shank into the receiver tube, the tip of the plunger catches the first aperture of the shank. The catching of the shank by the plunger tip holds the shank and receiver tube in the relative position whereby the first and second apertures are in the desired aligned configuration for insertion of a hitch pin. Therefore, an advantage of the present invention is that it effects the easy locating of the aligned configuration between the shank and receiver tube without having to push and pull the shank multiple times to find the correct position. The inventive assembly also advantageously holds the shank with the apertures in the aligned configuration in furtherance of insertion of the hitch pin. The hitch pin depresses the plunger upon being inserted through the aligned apertures and into the bushing mounted on the receiver tube.

The housing of the hitch pin assembly is constructed such that the plunger translates upon a projection housed in a track (in the preferred embodiment, a bore) of the plunger. When the hitch pin depresses the plunger tip, the plunger recedes along the projection in the bore of the plunger until the projection contacts the hitch pin tip. The projection is preferably externally threaded and the hitch pin tip is internally threaded. Once the contact between the projection and hitch pin tip is achieved, the user turns a key to engage the threads of the externally threaded projection with the internally threaded tip of the hitch pin. As the projection threads into the hitch pin, the head of the hitch pin is drawn tight against the outside of the sidewall of the receiver tube and the bushing squeezes against the side of the shank. The surfaces of the structures are therefore drawn into tight contact with each other in a manner that prevents the shank from moving transversely, and thus rattling, in the receiver tube. With the projection fully engaged to the hitch pin and the assembly, receiver and shank structures drawn in tight contact, the hitch pin can be locked in place via a lock contained within the housing.

The novel hitch pin assembly can be included as part of a system for connecting an accessory device to a motor vehicle that includes the receiver tube sized and shaped to receive the shank of an accessory device. The invention is further directed to an embodiment method for connecting the shank of an accessory device to a receiver tube as above described. The method includes providing: a hitch pin, a shoulder bushing and a housing. The hitch pin has a head and a hitch pin tip. The housing has a spring-loaded plunger. The spring-loaded plunger has a plunger tip. The shoulder bushing is inserted into the interior cavity of the receiver tube and then through the first aperture of the receiver tube. The housing is then removably connected to the body of the shoulder bushing projecting out from the receiver tube. It is preferable that the action of removably connecting the housing to the shoulder bushing is achieved by threading the housing onto the bushing. Upon connection of the housing to the bushing, the plunger extends through the bore of the shoulder bushing such that the plunger tip projects into the interior cavity of the receiver tube.

The shank is then telescopically slid into the interior cavity of the receiver tube until the plunger tip catches the first aperture of the shank. When this occurs the first and second apertures of the receiver tube and the shank are all in alignment in the described aligned configuration. The hitch pin is then easily inserted through the aligned first and second apertures and into the bushing. At this point the user pushes the hitch pin against the plunger causing the plunger to recede and its captive projection to extend out from the plunger and into engageable contact with the hitch pin tip. The projection preferably engages the hitch pin tip by threading the projection into the tip of the hitch pin. The projection engaging the hitch pin is then locked into place via a lock built into the housing.

BRIEF DESCRIPTION OF THE DRAWINGS

FIG. 1 is perspective view a receiver hitch assembly as is commonly used for retaining an accessory device such as a ball mount, bicycle carrier or cargo carrier.

DETAILED DESCRIPTION

Figure 2A:
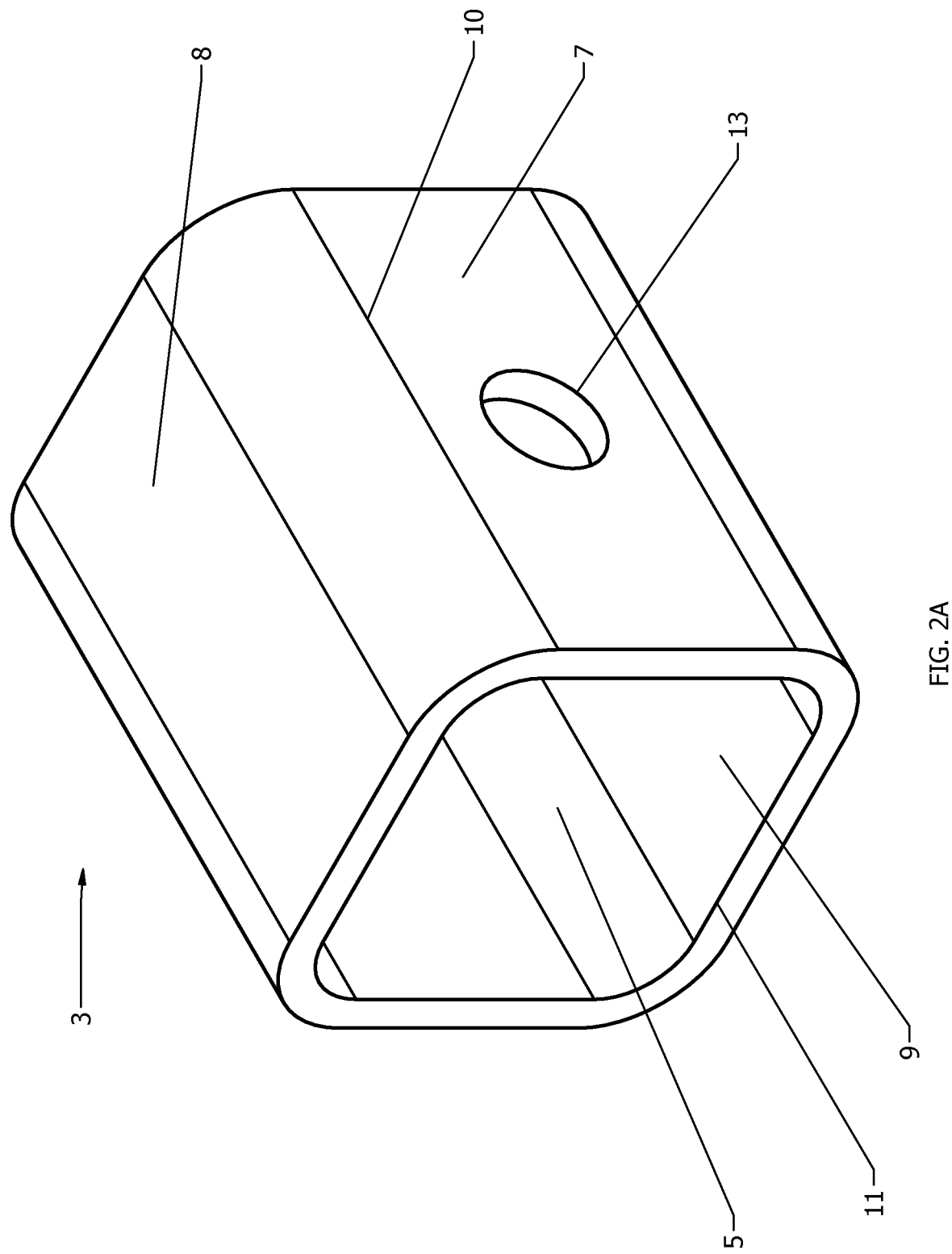
FIGS. 2A-2B are detailed perspective views of the sides of a receiver tube as is commonly found on receiver hitch assemblies such as the one depicted in FIG. 1.
Figure 2B:
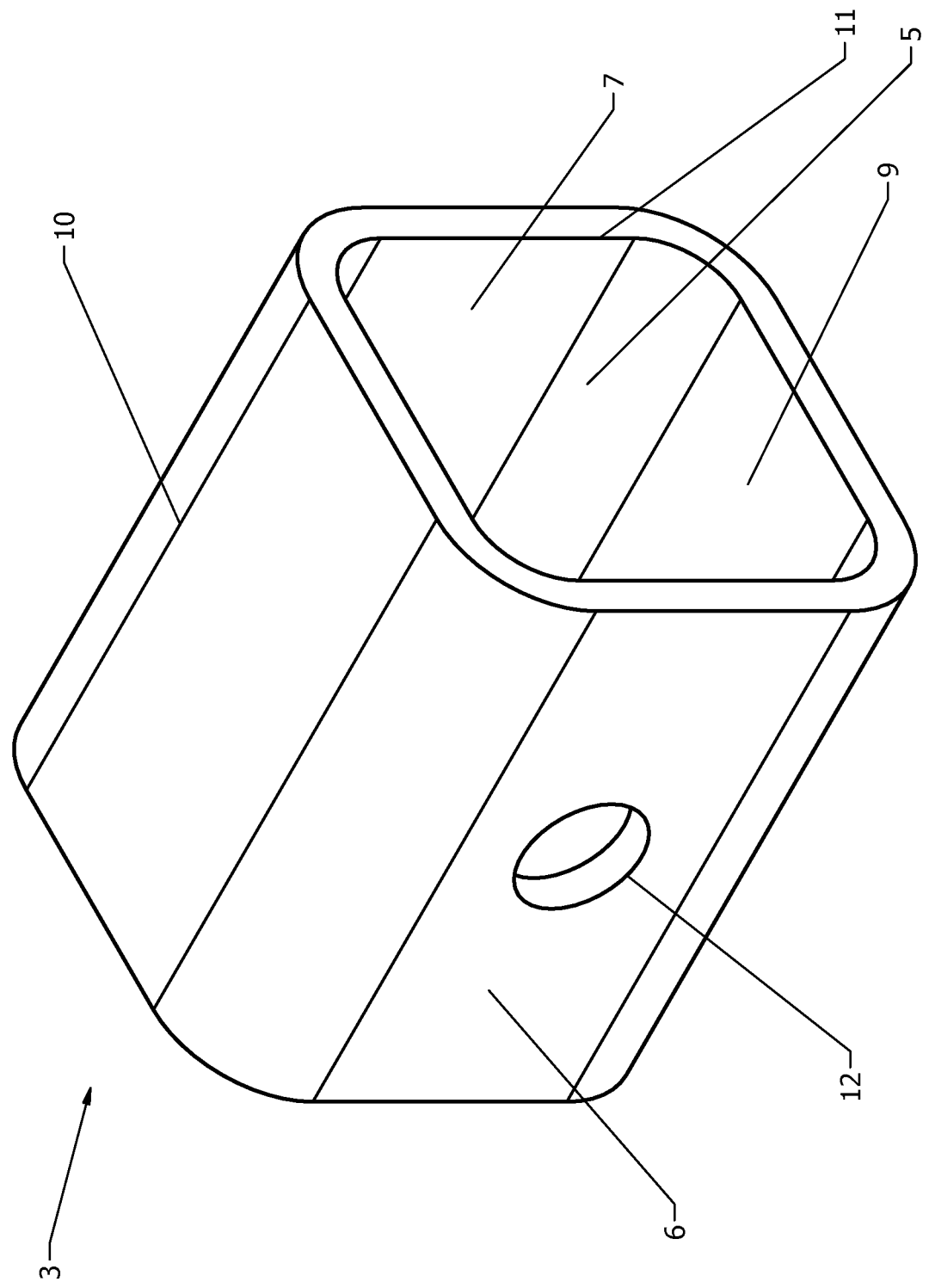
Figure 3A:
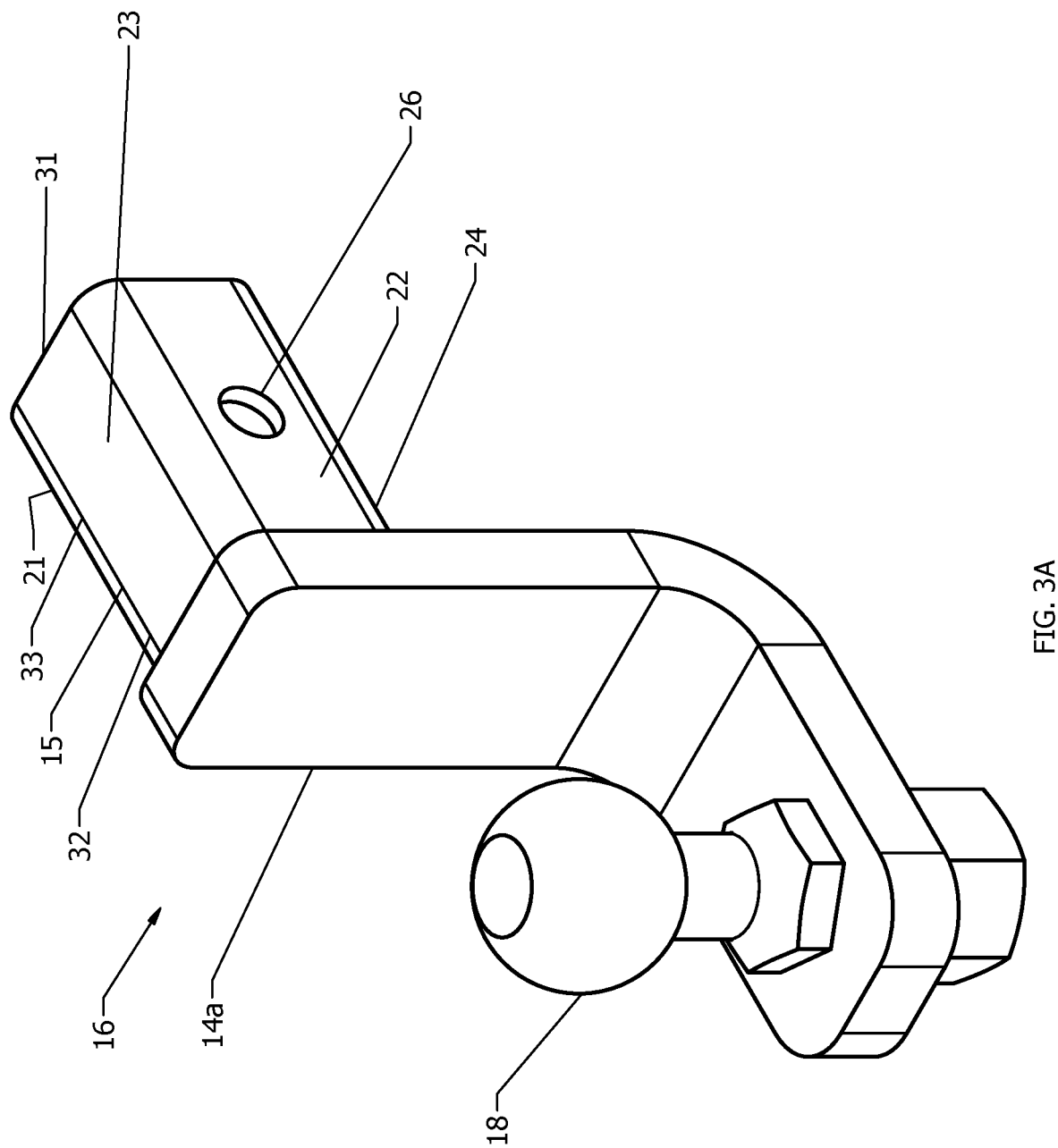
FIGS. 3A-3B depict in alternate perspective views a drawbar having a ball mount accessory attached to a shank, with the various parts of the shank labeled.
Figure 3B:
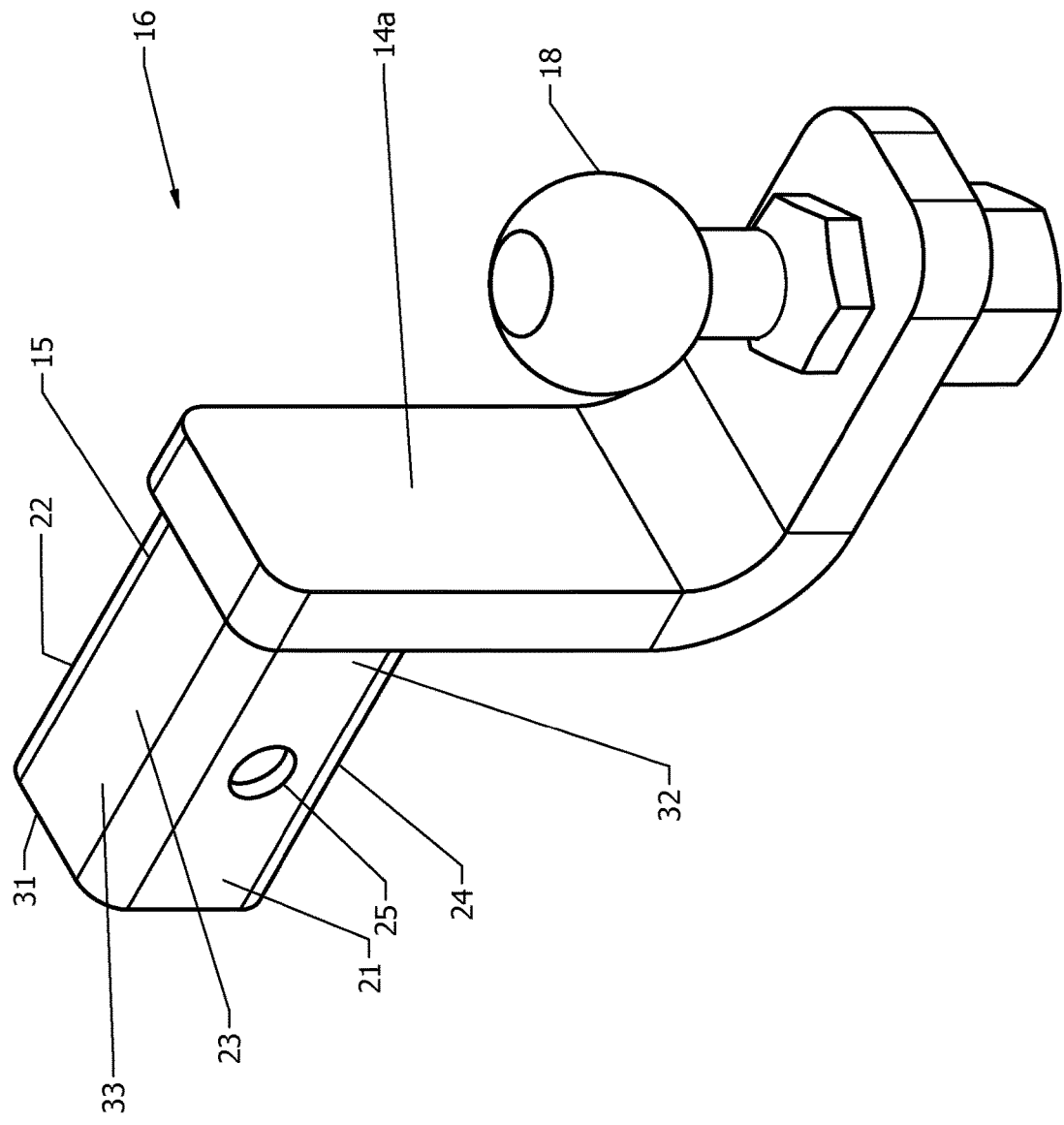
Figure 4A:
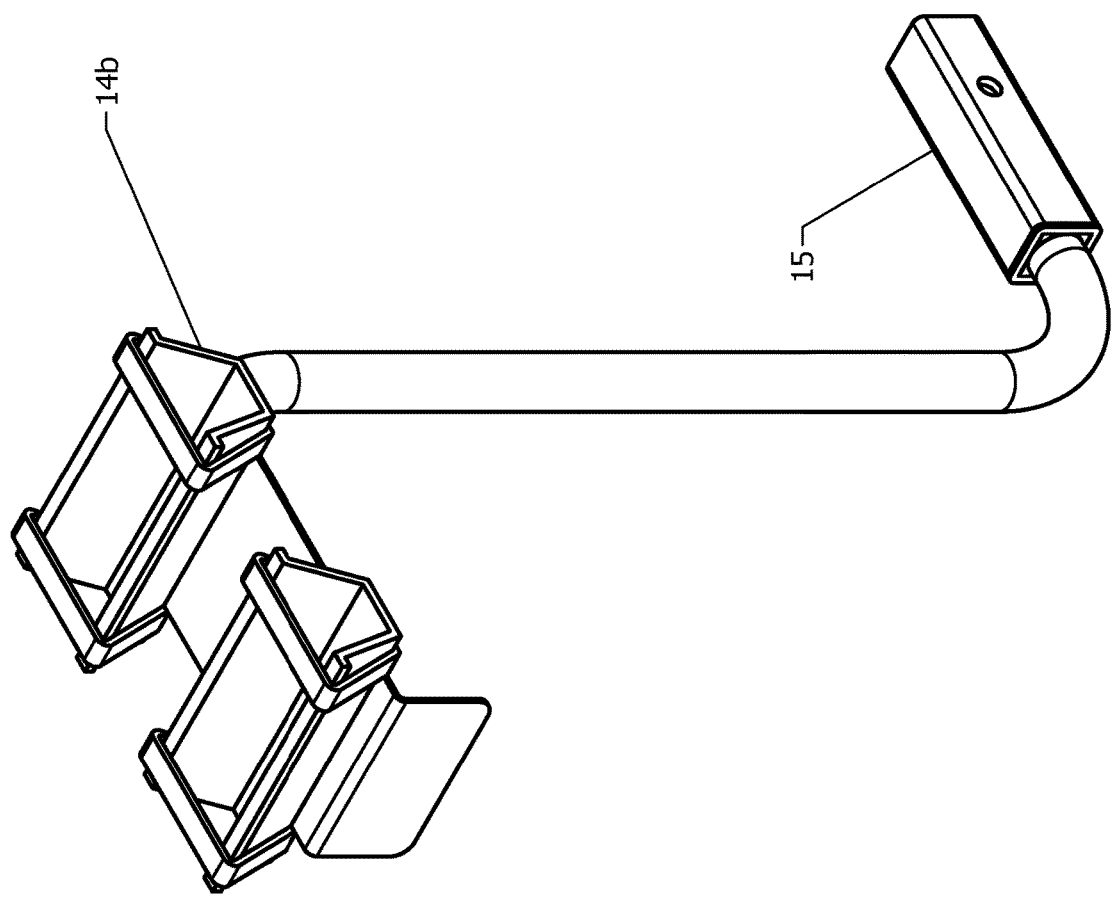
FIGS. 4A-4B respectively depict bicycle holding and cargo carrying accessory devices such as are commonly used with a hitch receiver assembly. Each of the accessory devices is attached to a shank, the shank is adapted for insertion into a receiver tube such as is shown in FIGS. 1-2B.
Figure 4B:
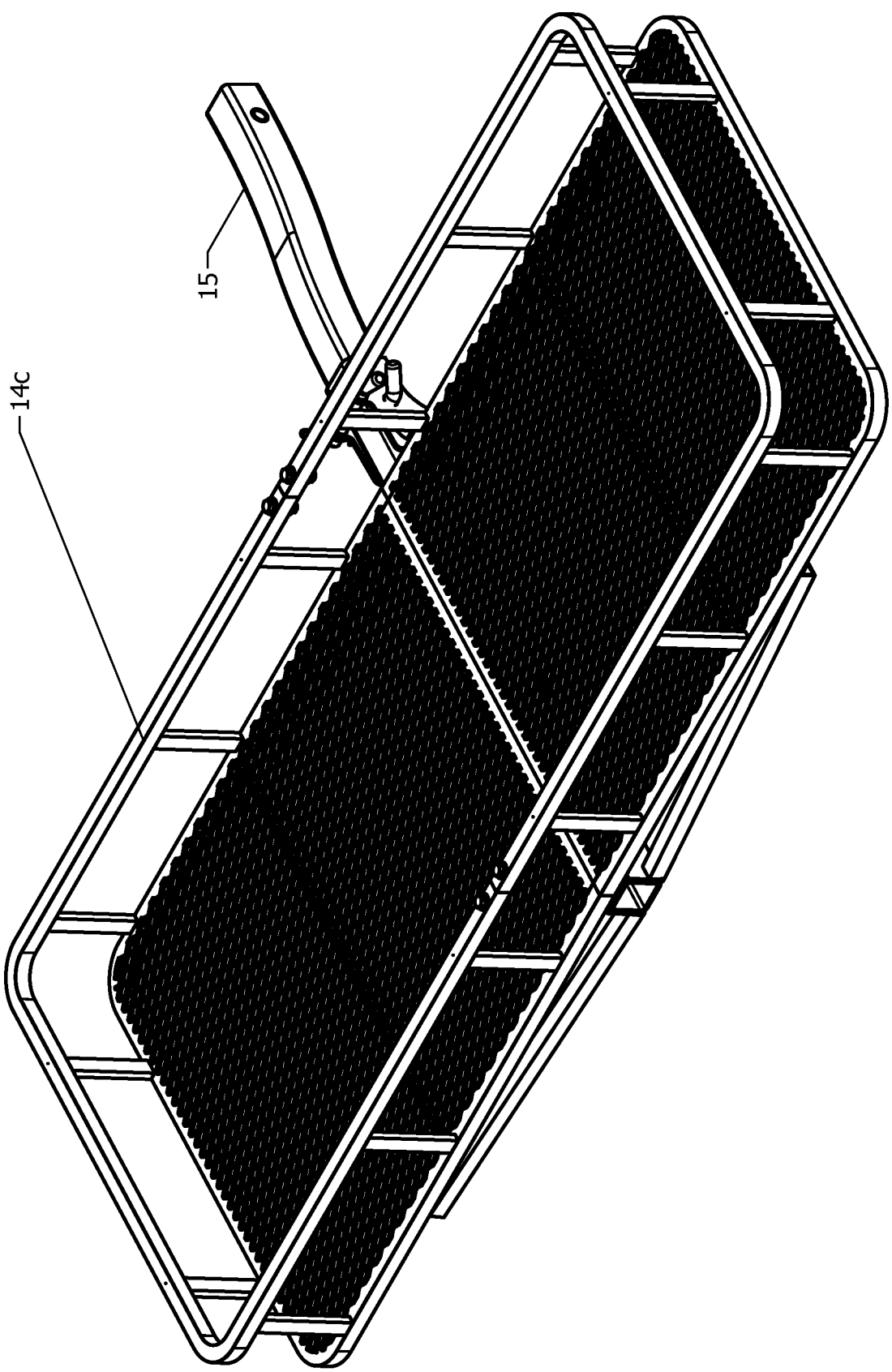

FIGS. 5-30 depict a preferred embodiment of the present invention and its components that may be expressed in the form of an apparatus, system and method. The invention in all its forms is intended for usage with the commonly understood prior art receiver hitch assembly 1 as is shown in FIG. 1 for mounting on a motor vehicle. As explained herein and shown in the figures, the present invention hitch pin assembly 50 will be deployed upon a receiver hitch assembly known in the art. In this respect, receiver hitch assembly 1 includes receiver tube 3 attached to frame 2, which mounts to the underside of a motor vehicle. Receiver tube 3 has a square cross section made by first and second side walls 6, 7 perpendicularly extending between top wall 8 and bottom wall 9 that connect to define an interior cavity 5. Side walls 6, 7, top wall 8 and bottom wall 9 have an exterior surface 10. Receiver retains shank 15 of an accessory device. The accessory device can be any type of accessory device including, but not limited to, ball mount 14a shown in FIGS. 3A-3B, bike carrier 14b shown in FIG. 4A or cargo carrier 14c shown in FIG. 4B.

Interior cavity 5 has a dimension and shape designed to receive a particularly sized shank 15 that is attached to an accessory device and that is telescopically received by receiver tube 3 through receiver tube opening 11. Shank 15 has a square cross sectional shape defined by first and second side walls 21, 22, top wall 23 and bottom wall 24. Both shank 15 and receiver tube 3 include opposing apertures on their side panels. Receiver tube 3 has first aperture 12 located on first side wall 6 and second aperture 13 located on second side wall 7. Shank 15 has first aperture 25 located on first side wall 21 and second aperture 26 located on second side wall 22.

In practical use, an apparatus or system embodiment of the improved hitch pin assembly shown in the figures will normally be implemented on a hitch receiver assembly 1 mounted on the back of a motor vehicle resting on a surface or floor considered horizontal in reference to the user. Thus, the directional terms "vertical" and "horizontal" and the like are used to describe a receiver tube with respect to the orientation representatively illustrated in FIGS. 1-10 and are employed merely for the purposes of clarity and illustration. For example, in the orientation shown in FIG. 6A, the vertical direction is depicted by the arrowed line labeled V and the horizontal direction is depicted by the arrowed line labeled H. The term "outwardly" is used to describe the directional component away from the center of interior cavity 5 of receiver tube 3.

In addition, the terms "vertical" and "vertically" mean a direction substantially normal to or away from a surface of top wall 8 or bottom wall 9. The terms "horizontal" and "horizontally" mean a direction substantially parallel to that of top wall 8 or bottom wall 9. The terms "substantially perpendicular" and "substantially parallel" mean with respect to a described orientation, structure or force, the stated orientation, structure or force is sufficiently perpendicular or parallel such that performance of the described orientation, structure or force, from the perspective of one with ordinary skill in the art, is the same as though the orientation, structure or force is precisely perpendicular or parallel.

Figure 5:
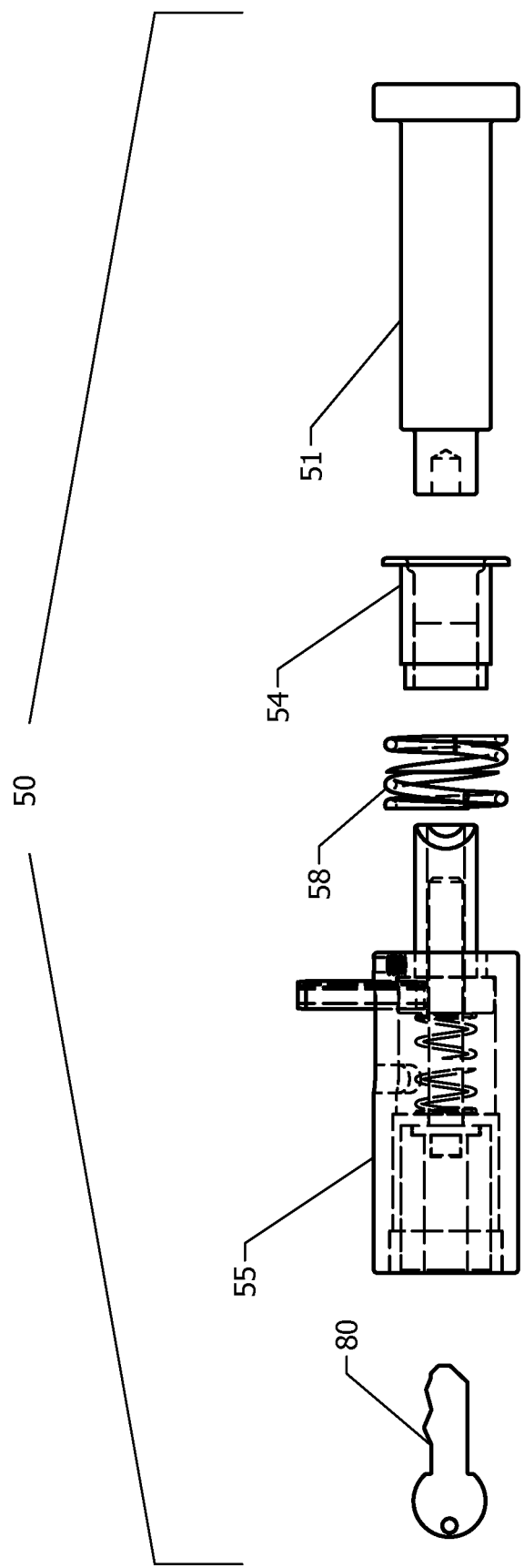
FIG. 5 is an elevation view of an embodiment of the present invention hitch pin assembly and its preferred components.

Referring now to FIGS. 5-30 the invention in various preferred embodiments will be described more particularly. FIG. 5 is an elevation view of a preferred embodiment of present invention hitch pin assembly 50 and its components. As shown in the figures, inventive hitch pin assembly 50 is ideally suited for use with a receiver hitch assembly 1 having a receiver tube 3 with an interior cavity 5 sized and shaped to telescopically receive the shank 15 of an accessory device. Receiver tube 3 and shank 15 each have respective opposing first and second apertures 12, 13 and 25, 26 that are configurable in the before-described aligned configuration when receiver tube 3 telescopically receives shank 15.

Figure 6A:
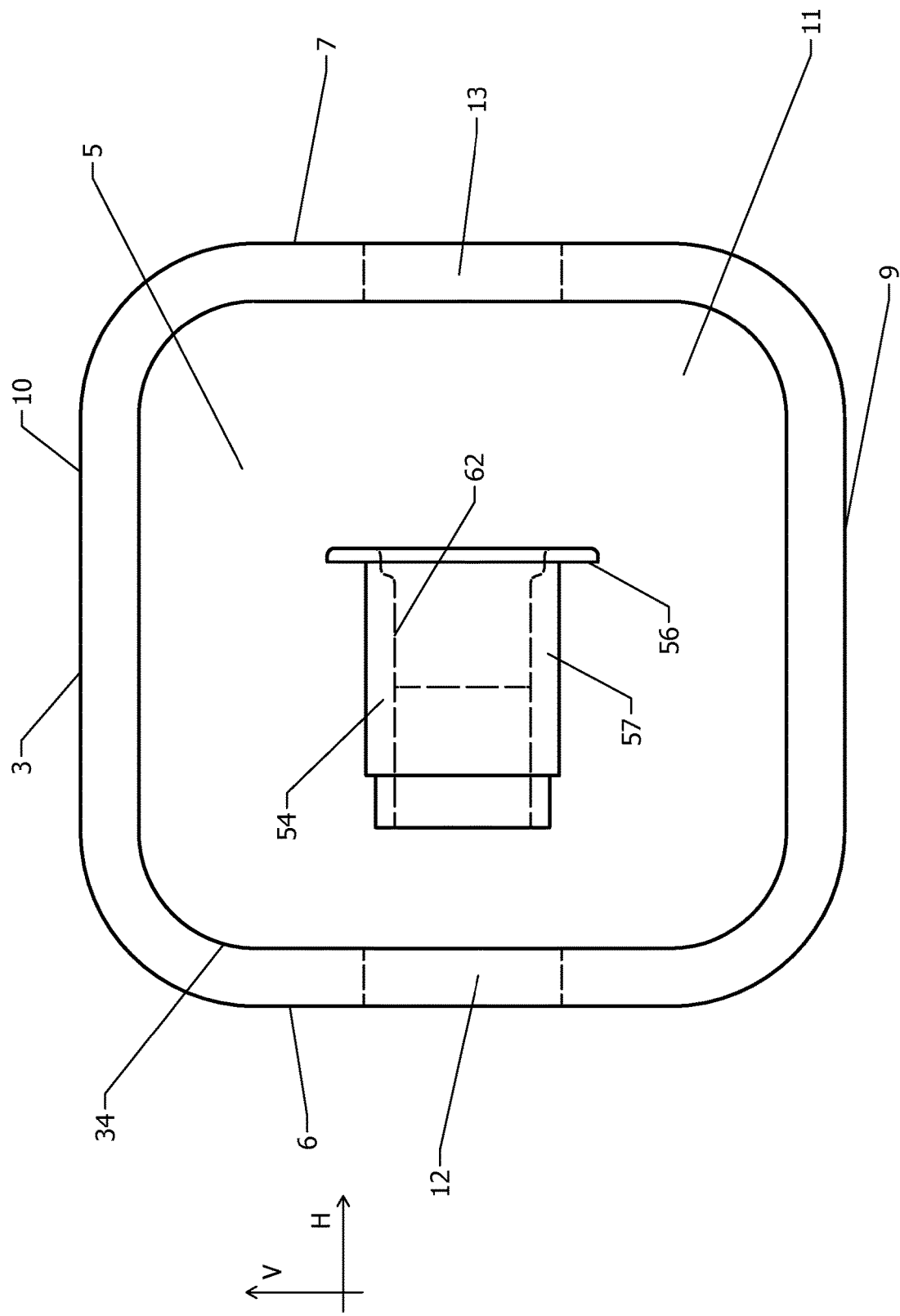
FIG. 6A is an elevation view depicting the shoulder bushing of the present invention hitch pin assembly within the interior cavity of a receiver tube aligned with and ready for placement in the first aperture in the first side wall of a receiver tube.

Hitch pin assembly 50 comprises hitch pin 51 and housing 55. Hitch pin 51 has head 52 and tip 53. Hitch pin assembly 50 further includes shoulder bushing 54. Shoulder bushing 54 has shoulder 56 attached to shoulder body 57 sized and shaped for placement in either of first aperture 12 of first wall 6 or second aperture 13 of second wall 7 of receiver tube 3. For simplicity of discussion the detailed description is limited to describing bushing 54 as being located in first aperture 12, but it could easily be located in second aperture 13. In this respect, none of the usages of ordinal terms such as "first" or "second" are meant to be limiting, but instead are meant to be helpfully distinguishing. FIG. 6A depicts the situation in which shoulder bushing 54 is deployed within interior cavity 5 for insertion into first aperture 12 of first side wall 6 of receiver tube 3.

Figure 6B:
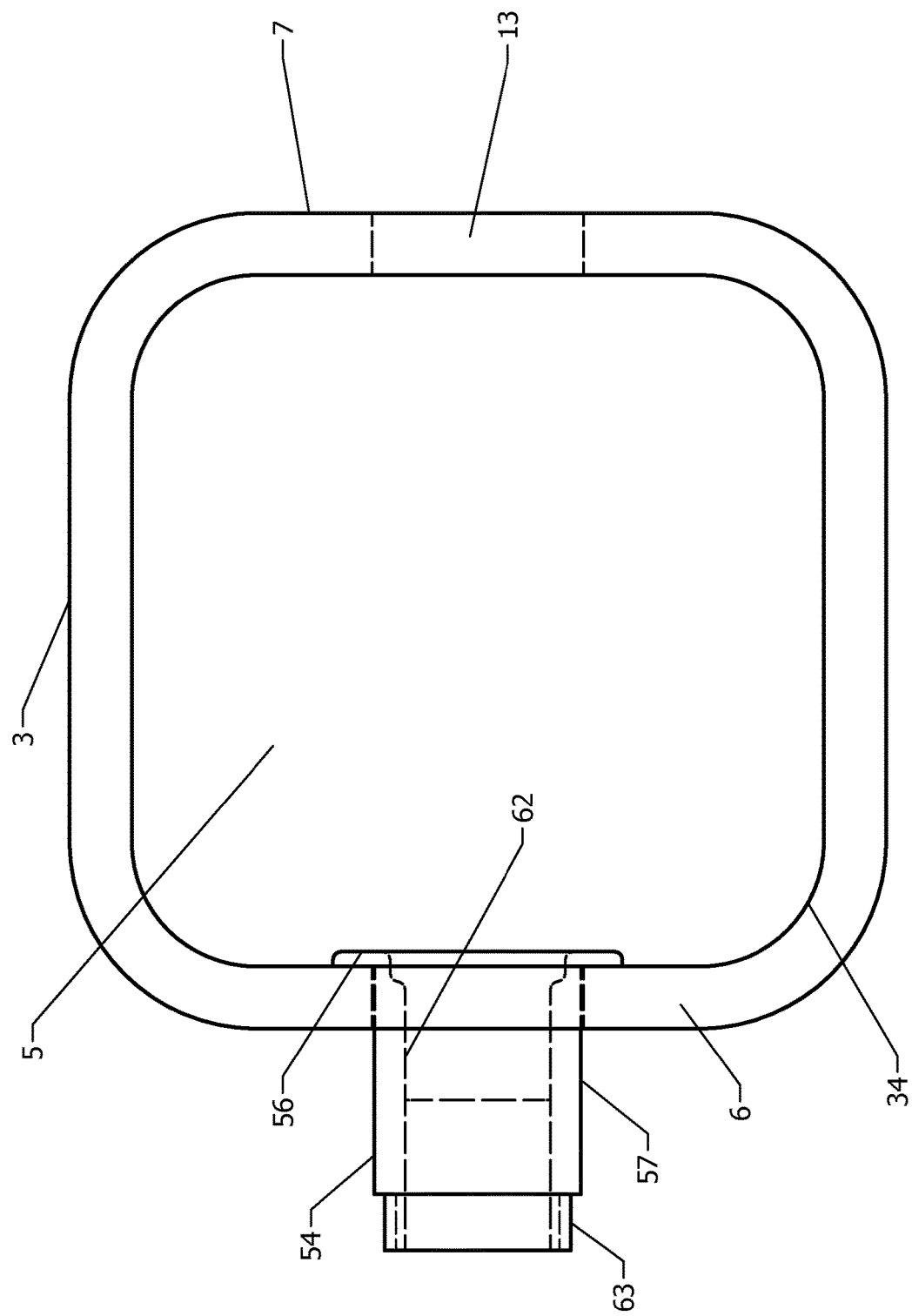
FIG. 6B is an elevation view depicting the shoulder bushing of FIG. 6A inserted into and received by the first aperture in the first side wall of a receiver tube.
Figure 7:
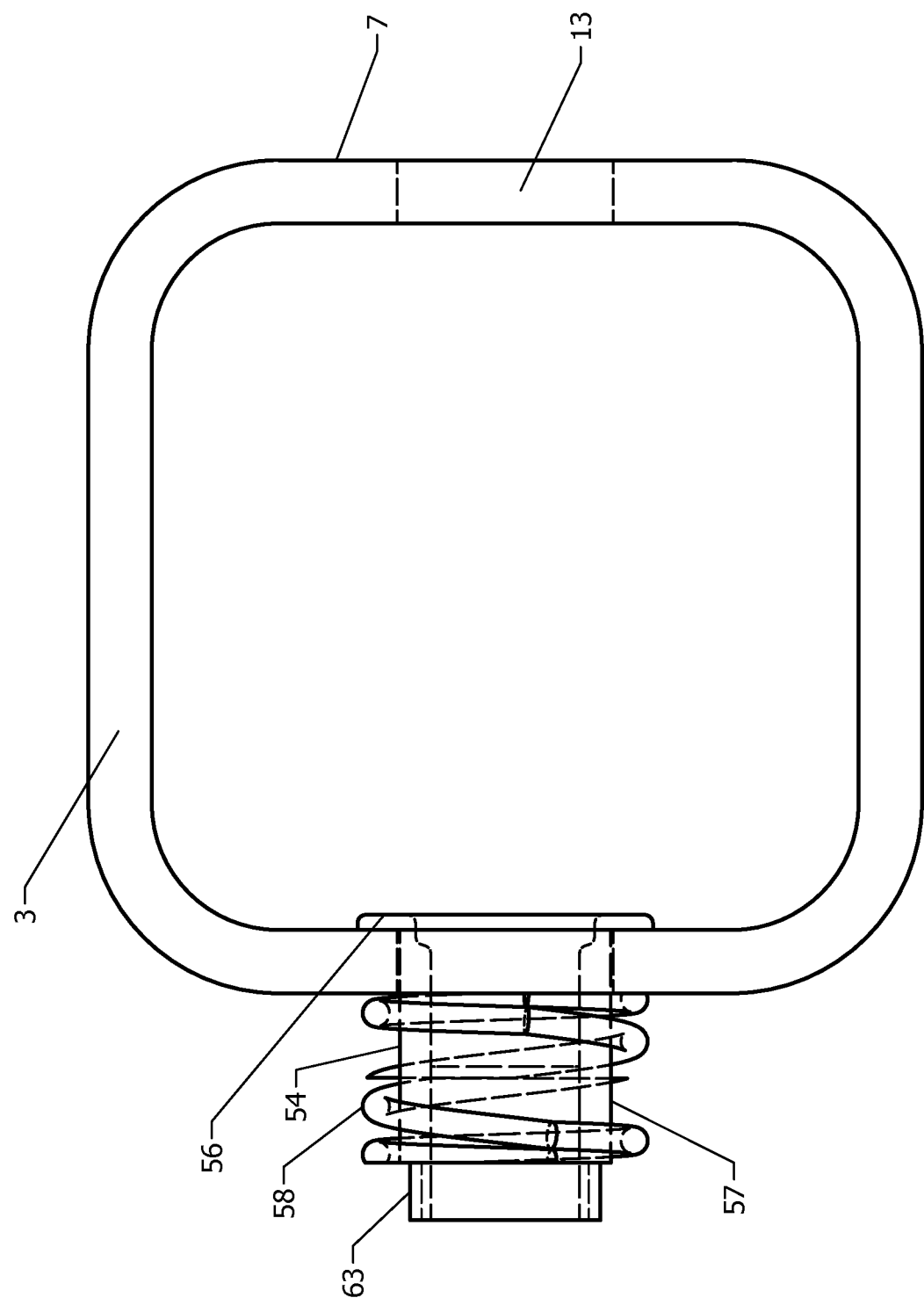
FIG. 7 is an elevation view depicting components of an embodiment hitch pin assembly and, more particularly, the placement of an external compression spring over the body of the shoulder bushing. The shoulder bushing projects outwardly from the exterior surface of the first side wall of the receiver tube.
Figure 8:
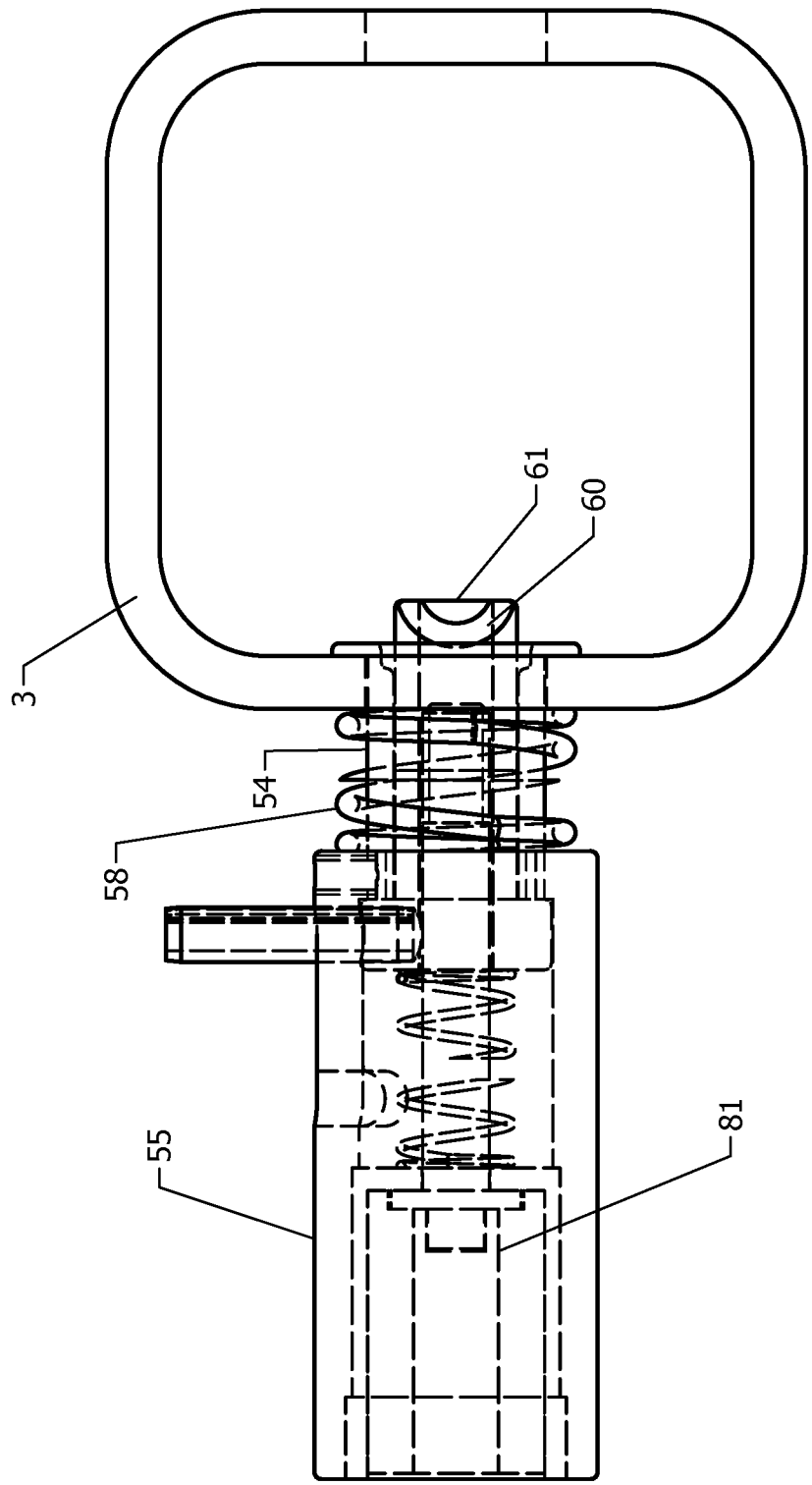
FIG. 8 is an elevation view depicting components of an embodiment hitch pin assembly and, more particularly, the threaded attachment of the housing onto the outwardly projecting body of the shoulder bushing. The threading action compresses the external compression spring, which compression pushes the housing outwardly and draws the shoulder of the shoulder bushing flush against the interior surface of the first side wall of the receiver tube. The plunger of the housing is inserted through the shoulder bushing and its tip projects into the interior cavity of the receiver tube.
Figure 9:
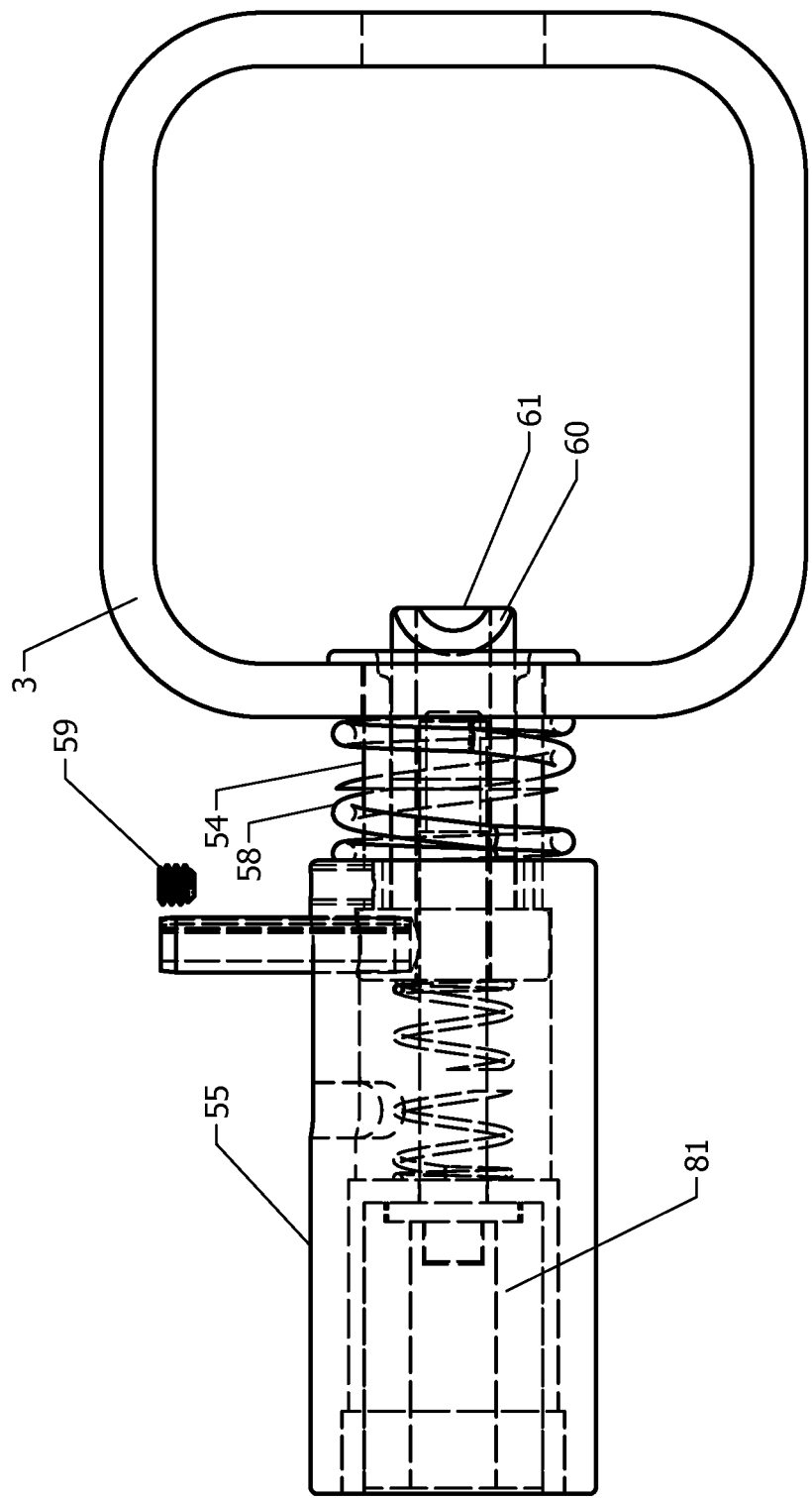
FIG. 9 is an elevation view depicting components of an embodiment hitch pin assembly and, more particularly, the readying of a set screw to secure the housing threaded over the outwardly projecting body of the shoulder bushing that is installed in the first aperture of the first side wall of the receiver tube. The plunger of the housing is inserted through the shoulder bushing and its tip projects into the interior cavity of the receiver tube.
Figure 10:
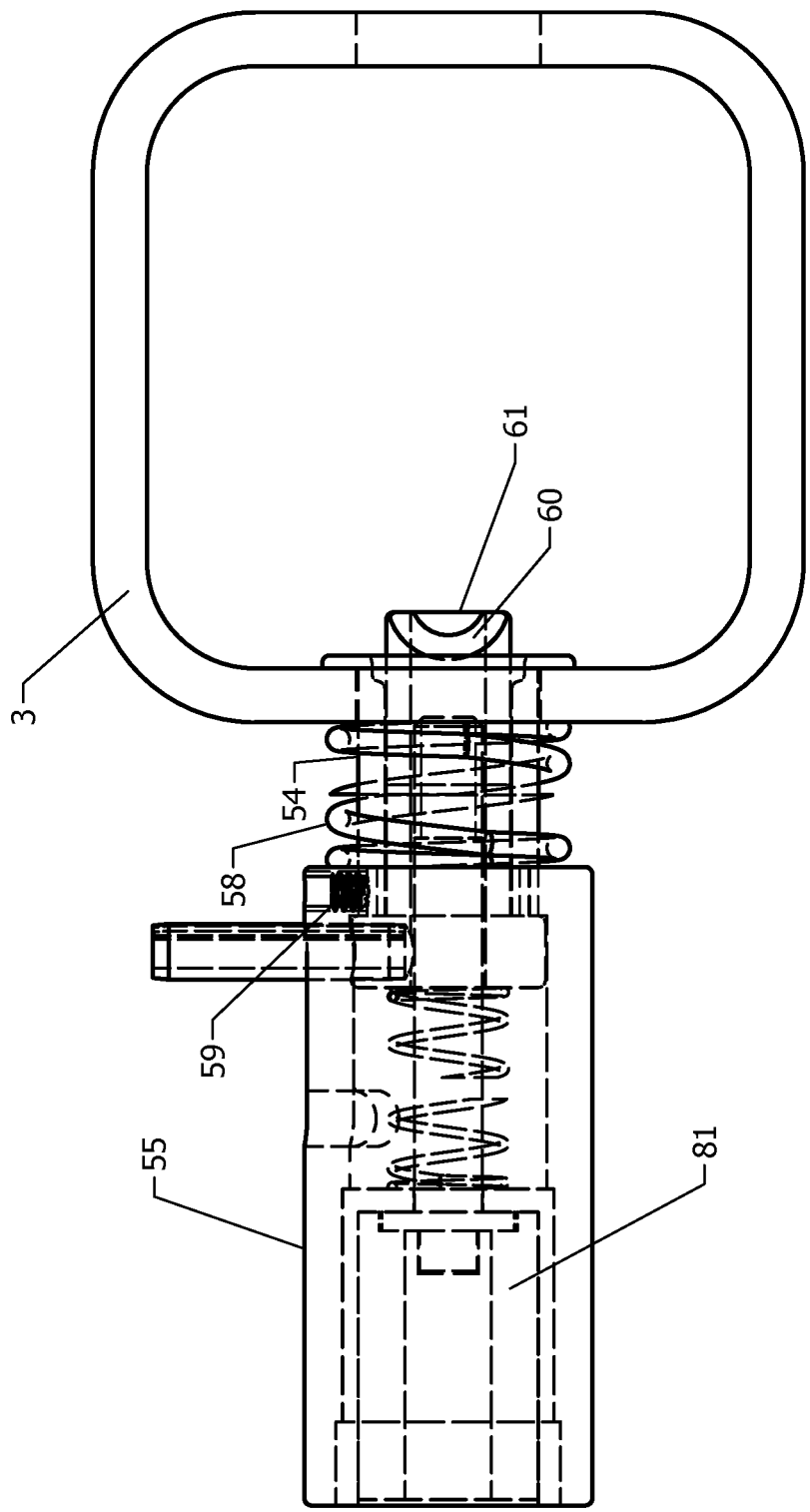
FIG. 10 is an elevation view depicting components of an embodiment hitch pin assembly and, more particularly, the installation of the set screw affixing the housing threaded over the outwardly projecting body of the shoulder bushing that is installed in the first aperture of the first side wall of the receiver tube. The plunger of the housing is inserted through the shoulder bushing and its tip projects into the interior cavity of the receiver tube.

Specifically, shoulder bushing 54 is inserted into interior cavity 5 of receiver tube 3 and then pressed outwardly into first aperture 12 such that its shoulder 56 contacts interior surface 34 of first wall 6. This is shown in FIG. 6B. When disposed in this fashion, body 57 of bushing 54 projects outwardly through first aperture 12. External spring 58 is then placed over projecting body 57 of bushing 54. This is shown in FIG. 7. External spring 58 is shown as a separate component of housing 55, but could be integrally attached to housing 55. Its purpose is to bias housing 55 away from side wall 6. Housing 55 removably connects to projecting body 57 of shoulder bushing 54. In the preferred embodiment, housing 55 and body 57 of shoulder bushing 54 have complementary threads. Housing 55 thereby threads onto body 57 in a manner that compresses external spring 58 against exterior surface 10 of first side wall 6. Once housing 55 is fully threaded onto body 57 it is secured in place with set screw 59. The foregoing preferred embodiment process of attaching and securing housing 55 to shoulder bushing 54 is shown in FIGS. 8-10. As shown in these figures, the compression of external spring 58 biases housing 55 away from surface 10 and causes shoulder 56 of bushing 54 to be pulled tightly against interior surface 34 of first side wall 6.

Figure 11:
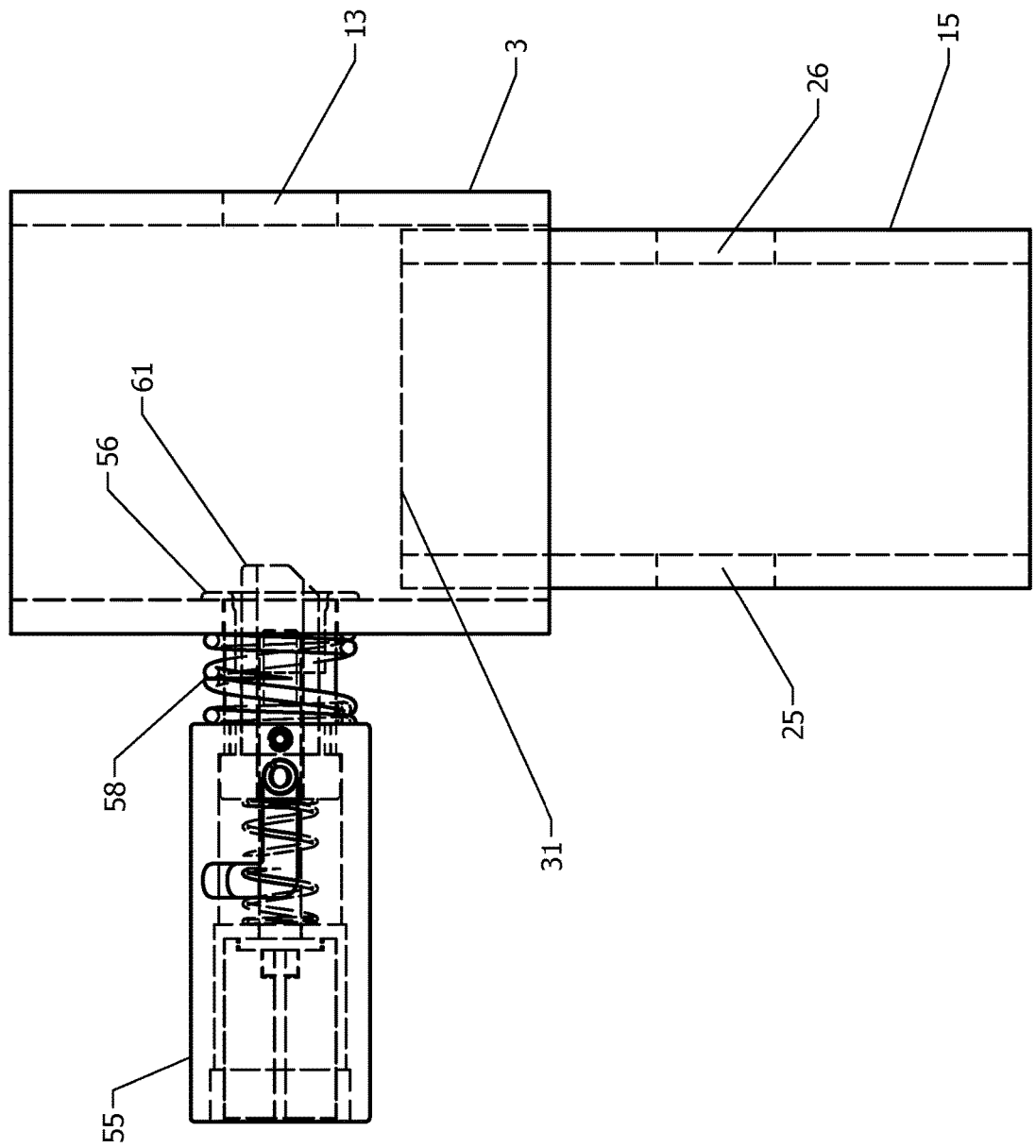
FIG. 11 is an overhead plan view depicting the housing with plunger of an embodiment of the present invention hitch pin assembly affixed on the first side wall of the receiver tube with the leading end of the shank of an accessory device inserted just into the open end of the receiver tube.
Figure 12:
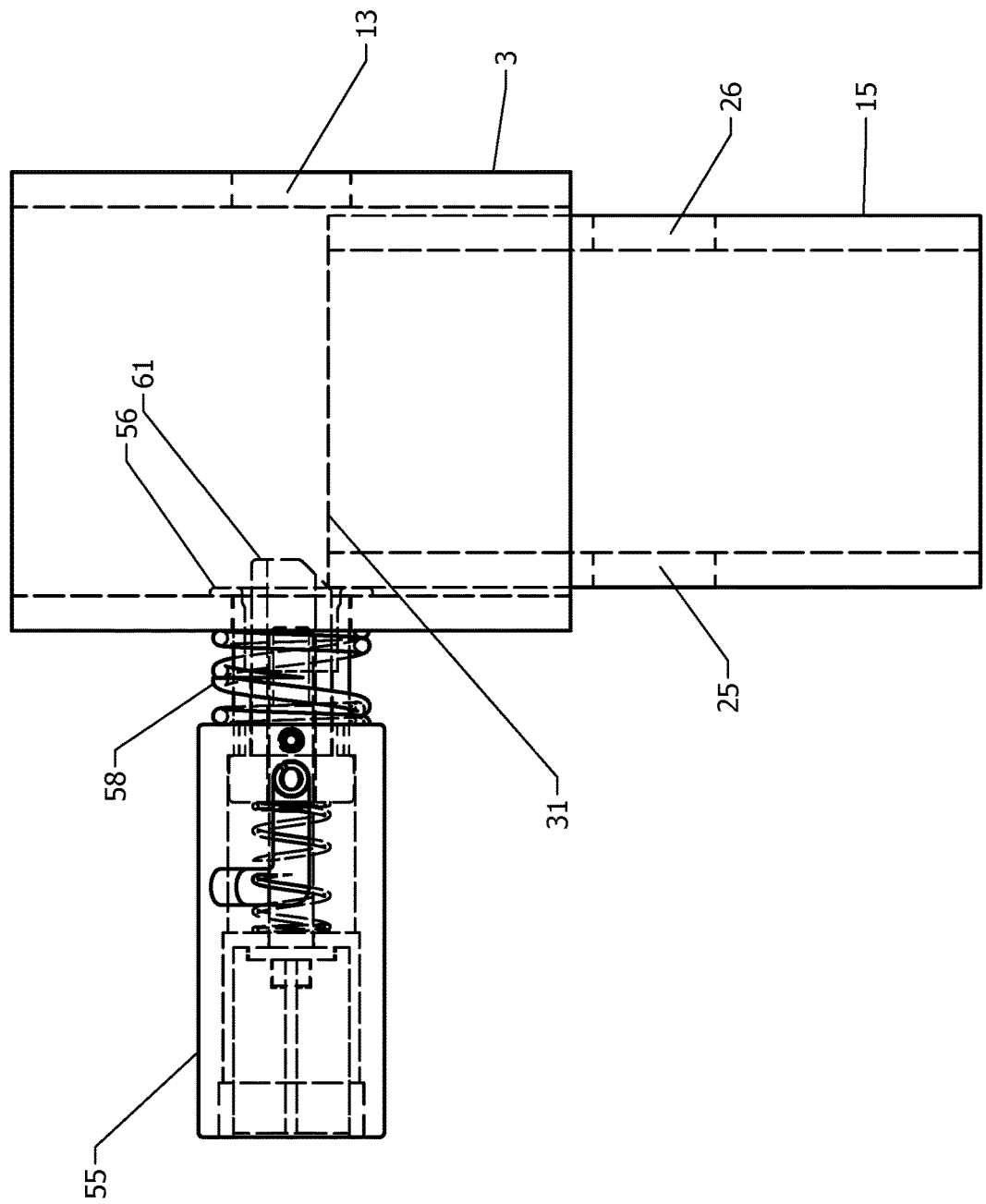
FIG. 12 is an overhead plan view depicting the housing with plunger of an embodiment of the present invention hitch pin assembly affixed on the first side wall of the receiver tube with the leading end of the shank of an accessory device inserted into the receiver tube at a point in which it is about to contact the plunger of the housing.
Figure 13:
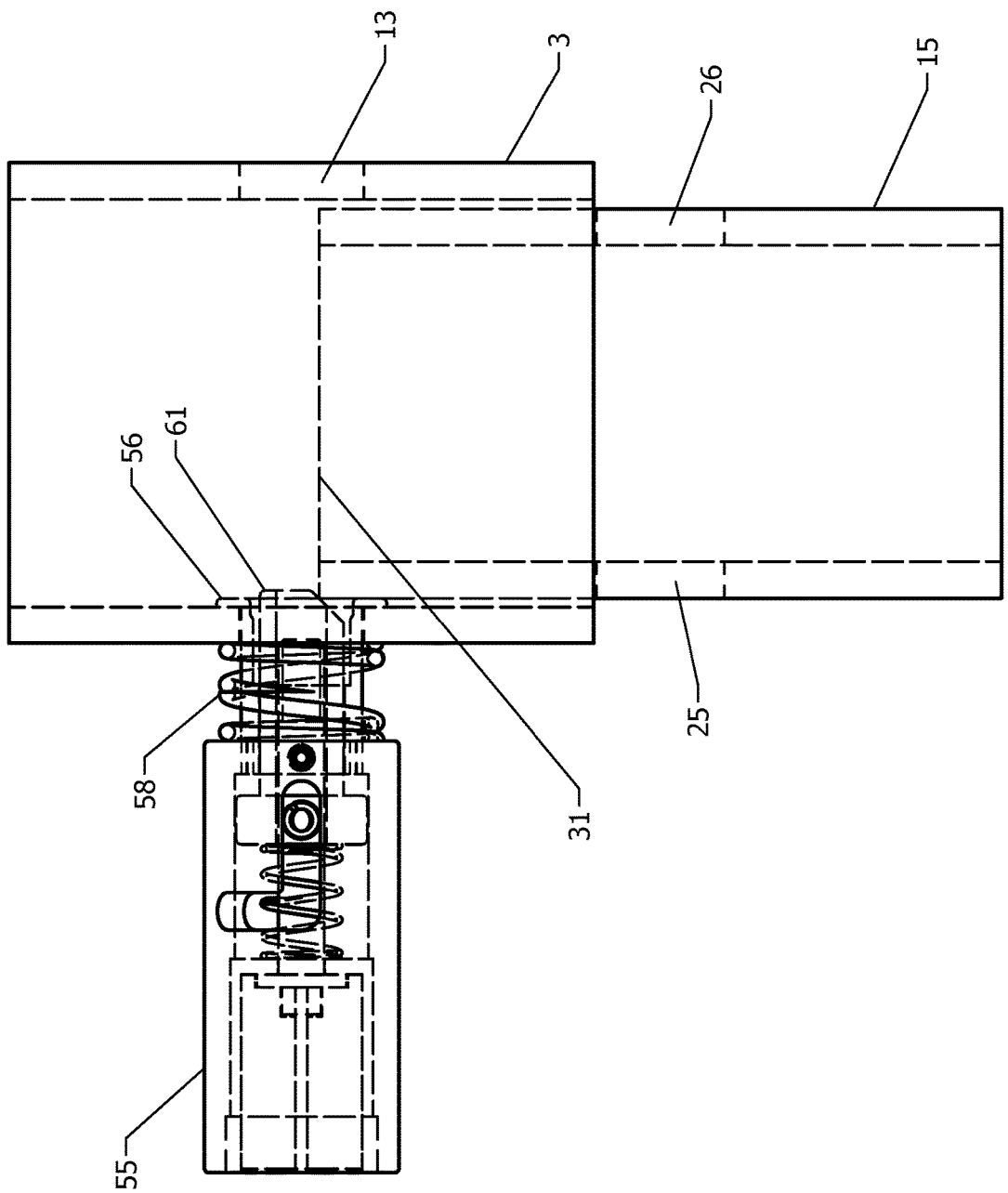
FIG. 13 is an overhead plan view depicting the housing with plunger of an embodiment of the present invention hitch pin assembly affixed on the first side wall of the receiver tube with the leading end of the shank of an accessory device inserted into the receiver tube at a point in which it has depressed a significant portion (approximately one-half) of the tip of the plunger of the housing into the shoulder bushing.
Figure 14:
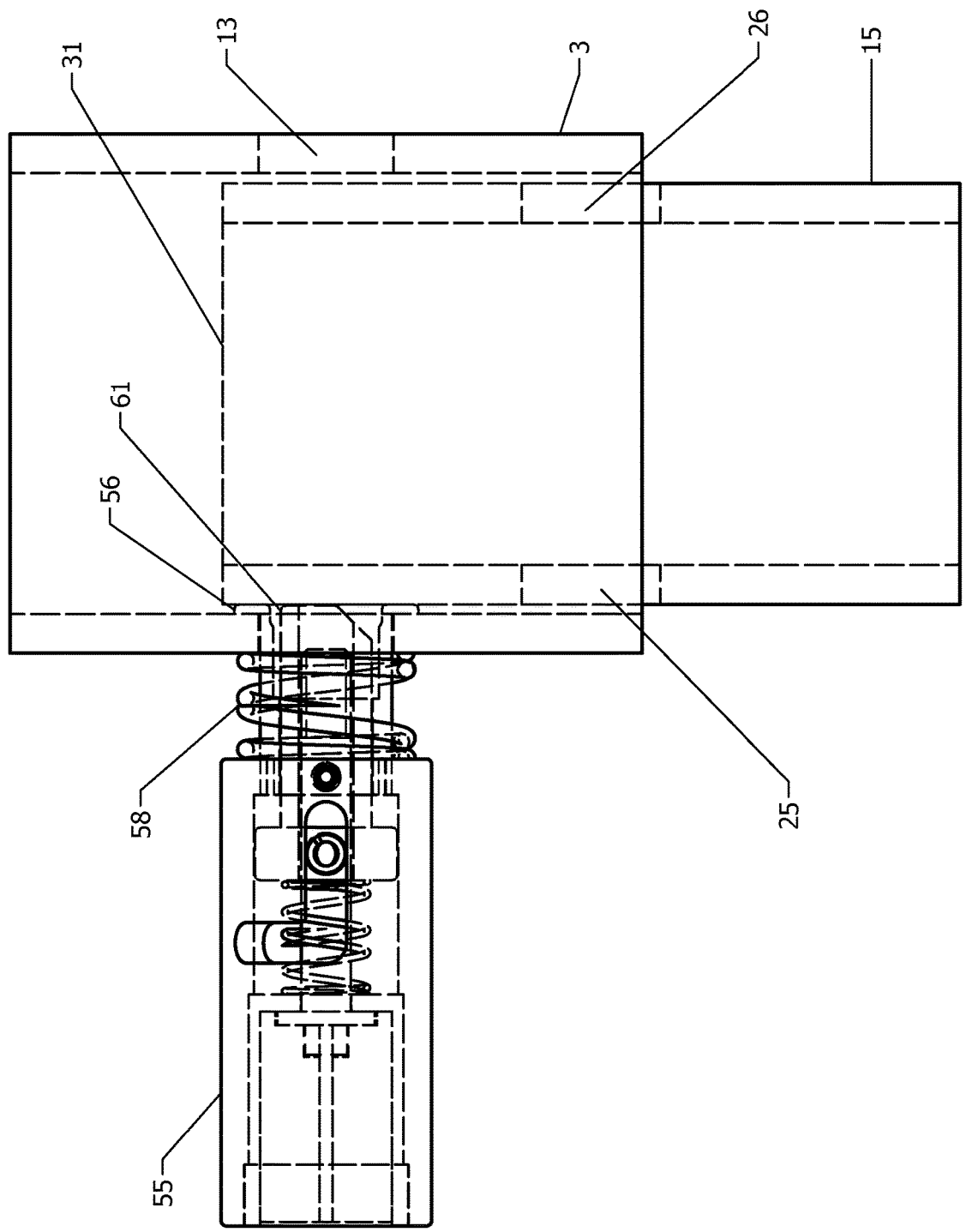
FIG. 14 is an overhead plan view depicting the housing with plunger of an embodiment of the present invention hitch pin assembly affixed on the first side wall of the receiver tube with the leading end of the shank of an accessory device inserted into the receiver tube at a point in which it has fully depressed the tip of the plunger of the housing into the shoulder bushing.
Figure 15:
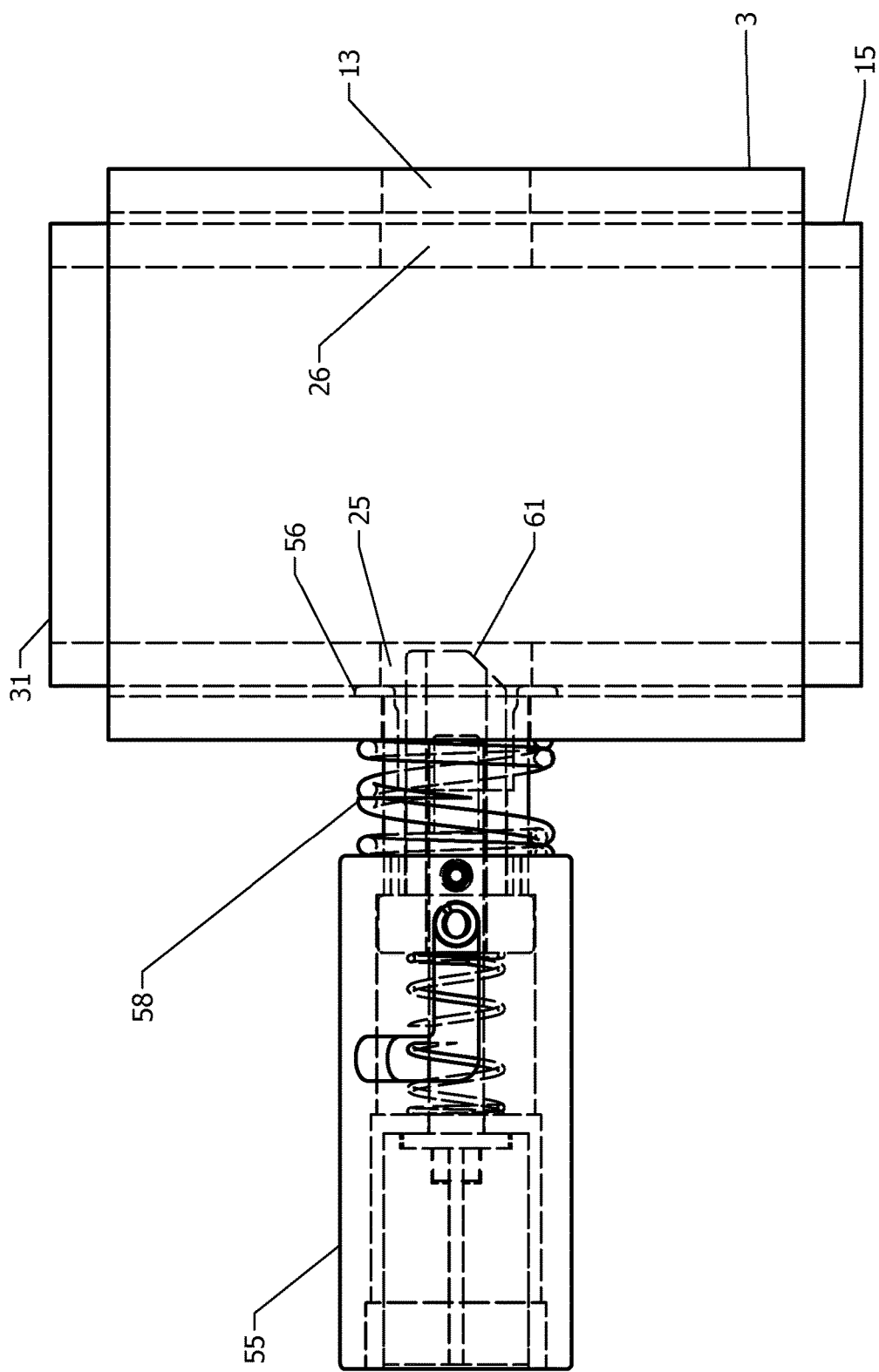
FIG. 15 is an overhead plan view depicting the housing with plunger of an embodiment of the present invention hitch pin assembly affixed on the first side wall of the receiver tube. The plunger has caught the first aperture in the first side wall of the shank and the side wall apertures of the shank are aligned with the side wall apertures of the receiver tube. The receiver tube and shank are positioned for placement of the hitch pin.

Housing 55 houses spring-loaded plunger 60. Spring-loaded plunger 60 has a plunger tip 61 at its distal end. When housing 55 is attached to bushing 54, spring-loaded plunger 60 extends into bore 62 of shoulder bushing 54 and plunger tip 61 projects into interior cavity 5 of receiver tube 3. This is shown in FIGS. 8-10. At this point shank 15 may be inserted into receiver tube 3 and slid to a position in which first and second apertures 12, 13 of receiver tube 3 are aligned with first and second apertures 25, 26 of shank 15. When apertures 12, 13, 25, 26 are in the aligned configuration, plunger tip 61 engages first aperture 25 of shank 15, thereby retaining shank 15 with apertures 12, 13, 25, 26 in the aligned configuration. The action of inserting and sliding shank 15 into receiver tube 3 to the point at which plunger tip 61 engages first aperture 25 of shank 15 is shown in FIGS. 11-15. In FIG. 11 shank 15 is in a position in which its leading end 31 has just been inserted into opening 11 of receiver tube 3. FIG. 12 shows shank 15 in a position where it is telescopically inserted into receiver tube 3 with leading end 31 about to make contact with plunger tip 61. FIG. 13 shows shank 15 in a position where it is telescopically inserted into receiver tube 3 and its leading end 31 has made contact with plunger tip 61 and is depressing spring-loaded plunger 60 back into bushing 54. FIG. 14 shows shank 15 in a position where it is telescopically inserted into receiver tube 3 with leading end 31 past plunger tip 61 and plunger 60 is blocked by first side wall 21 of shank 15 from entering interior cavity 5 of receiver tube 3. FIG. 15 shows shank 15 in a position where it is telescopically inserted into receiver tube 3 with its first and second apertures 25, 26 aligned with first and second apertures 12, 13 of receiver tube 3. In this position, plunger tip 61 projects into aperture 25 of shank 15, thereby holding shank 15 in a position in which apertures 12, 13, 25, 26 are in an aligned configuration.

Figure 16:
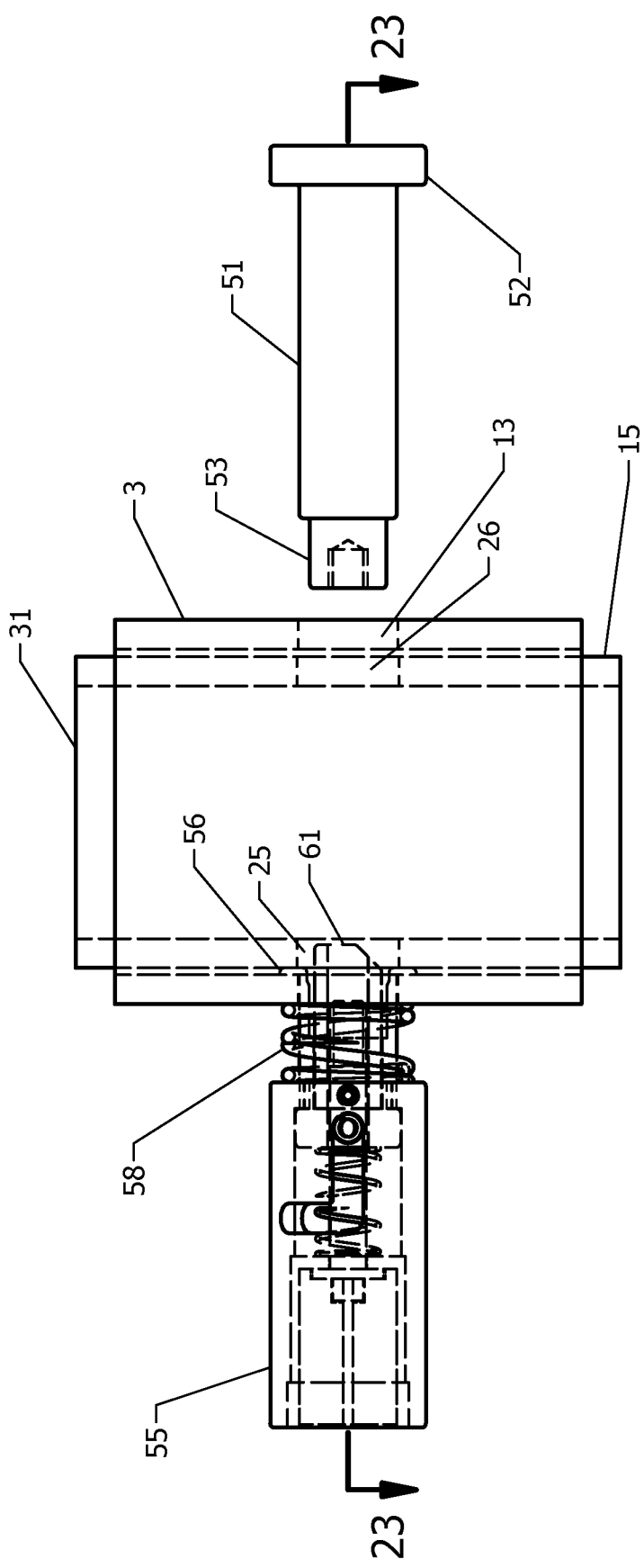
FIG. 16 is an overhead plan view depicting a hitch pin and the housing with plunger of an embodiment of the present invention hitch pin assembly affixed on the first side wall of the receiver tube with the side wall apertures of the shank and receiver tube in the aligned configuration. The hitch pin is shown ready for insertion into the aligned apertures.
Figure 17:
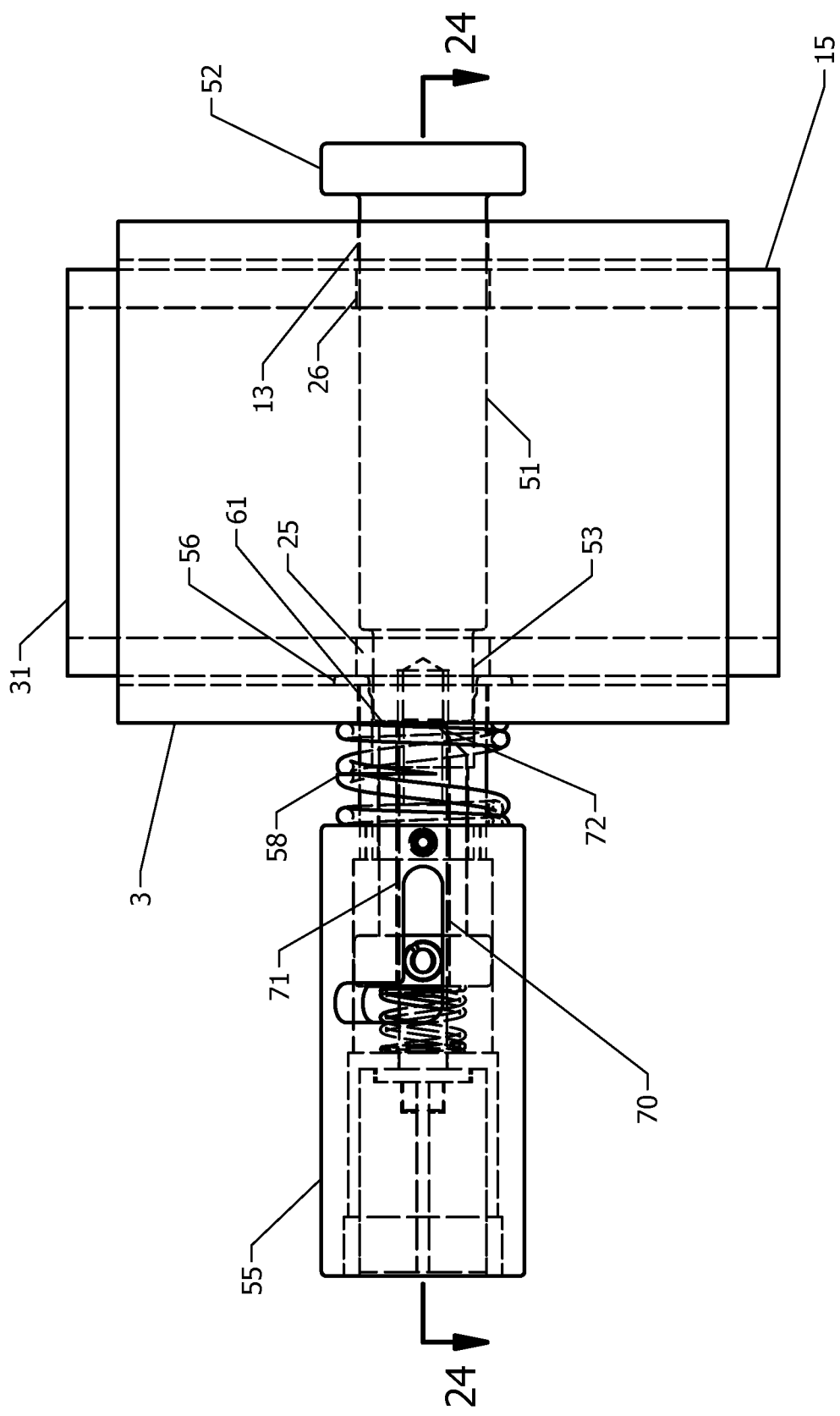
FIG. 17 is an overhead plan view depicting a hitch pin and the housing with plunger of an embodiment of the present invention hitch pin assembly affixed on the first side wall of the receiver tube. The hitch pin has been inserted through the aligned apertures of the shank and receiver tube, into the seated shoulder bushing and is depressing the plunger so as to bring the projection within the plunger into engageable contact with the hitch pin.
Figure 23:
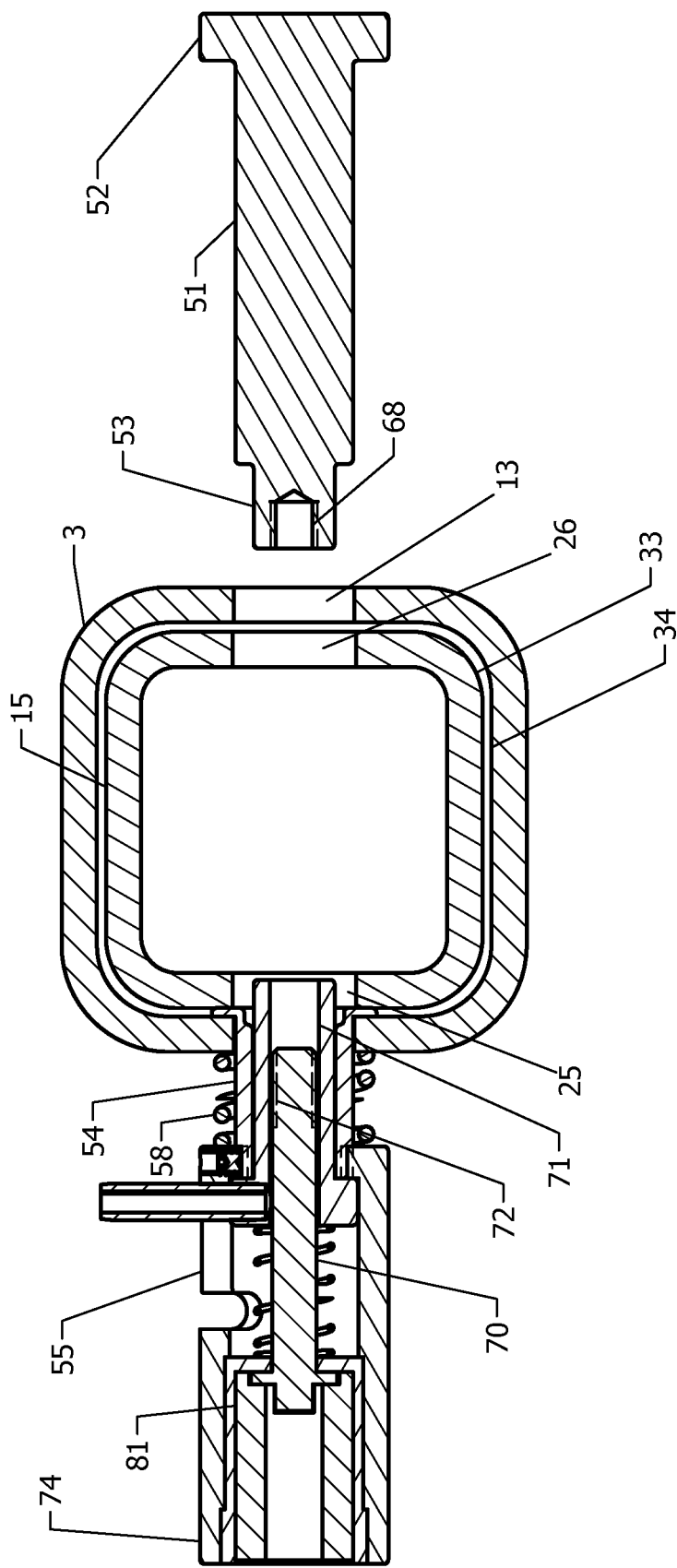
FIG. 23 is an elevation section view taken along line 23-23 of FIG. 16.
Figure 24:
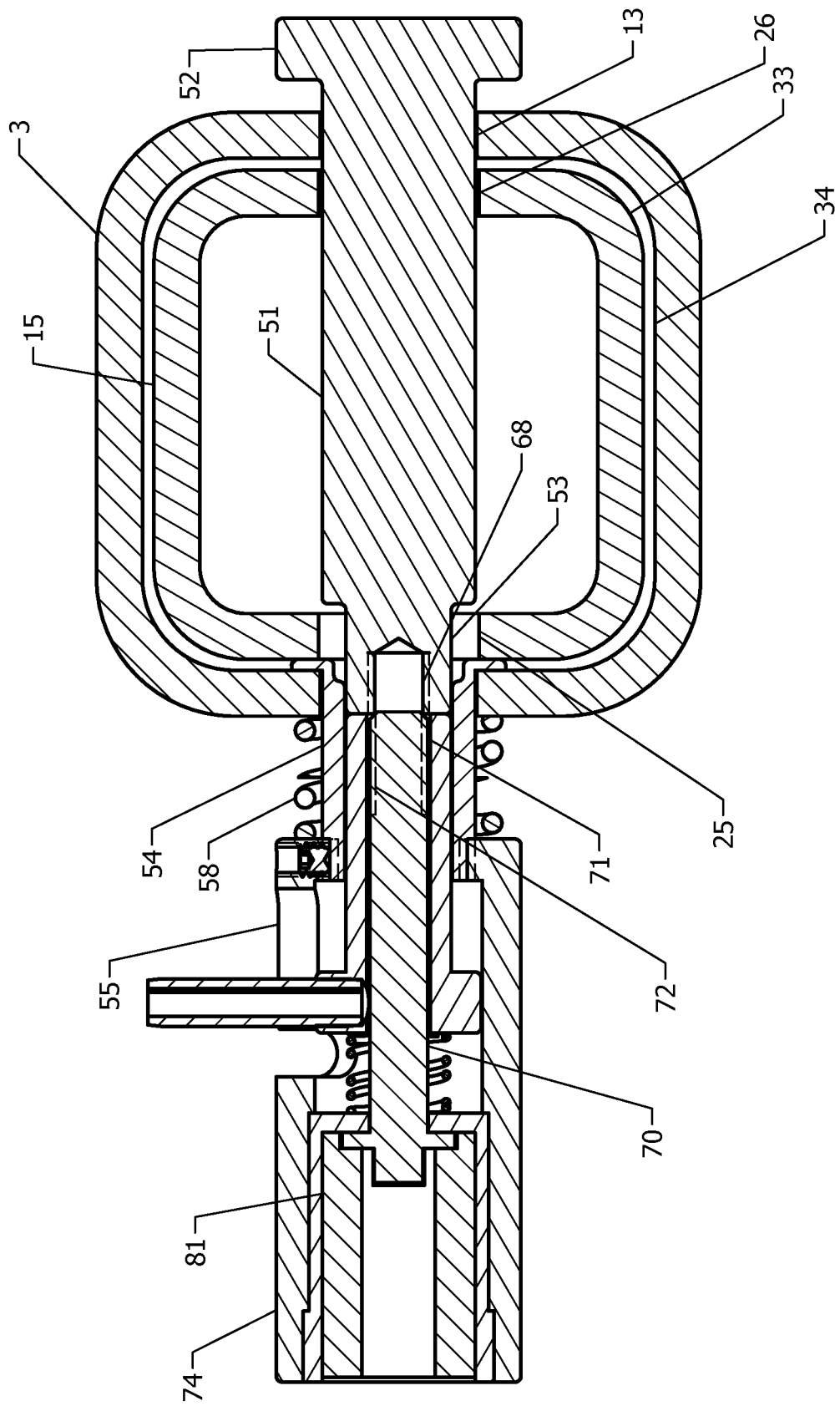
FIG. 24 is an elevation section view taken along line 24-24 of FIG. 17.

In FIGS. 16 and 23 hitch pin 51 is shown in its deployed state ready to be inserted through aligned apertures 12, 13, 25, 26. With apertures 12, 13, 25, 26 held in the aligned configuration hitch pin 51 is then inserted through aligned apertures 12, 13, 25, 26 from aperture 13 of second side wall 7 of receiver tube 3 until hitch pin tip 53 contacts plunger tip 61. Hitch pin 51 is pressed against plunger 60 depressing it and resulting in hitch pin tip 53 entering into bore 62 of bushing 54. This is shown in FIGS. 17 and 24.

Housing 55 advantageously includes a hitch pin engaging mechanism, which in the preferred embodiment is a rotatable threaded projection 70. Plunger 60 moves axially along the threaded projection 70 via aligned bore 71. The process by which this threaded projection engages is depicted in FIGS. 18-22 and 25-29. More specifically, as tip 53 of hitch pin 51 engages the tip 61 of plunger 60 and depresses it into housing 55, plunger 60 translates backward along threaded projection 70 via bore 71 in plunger 60.

Figure 18:
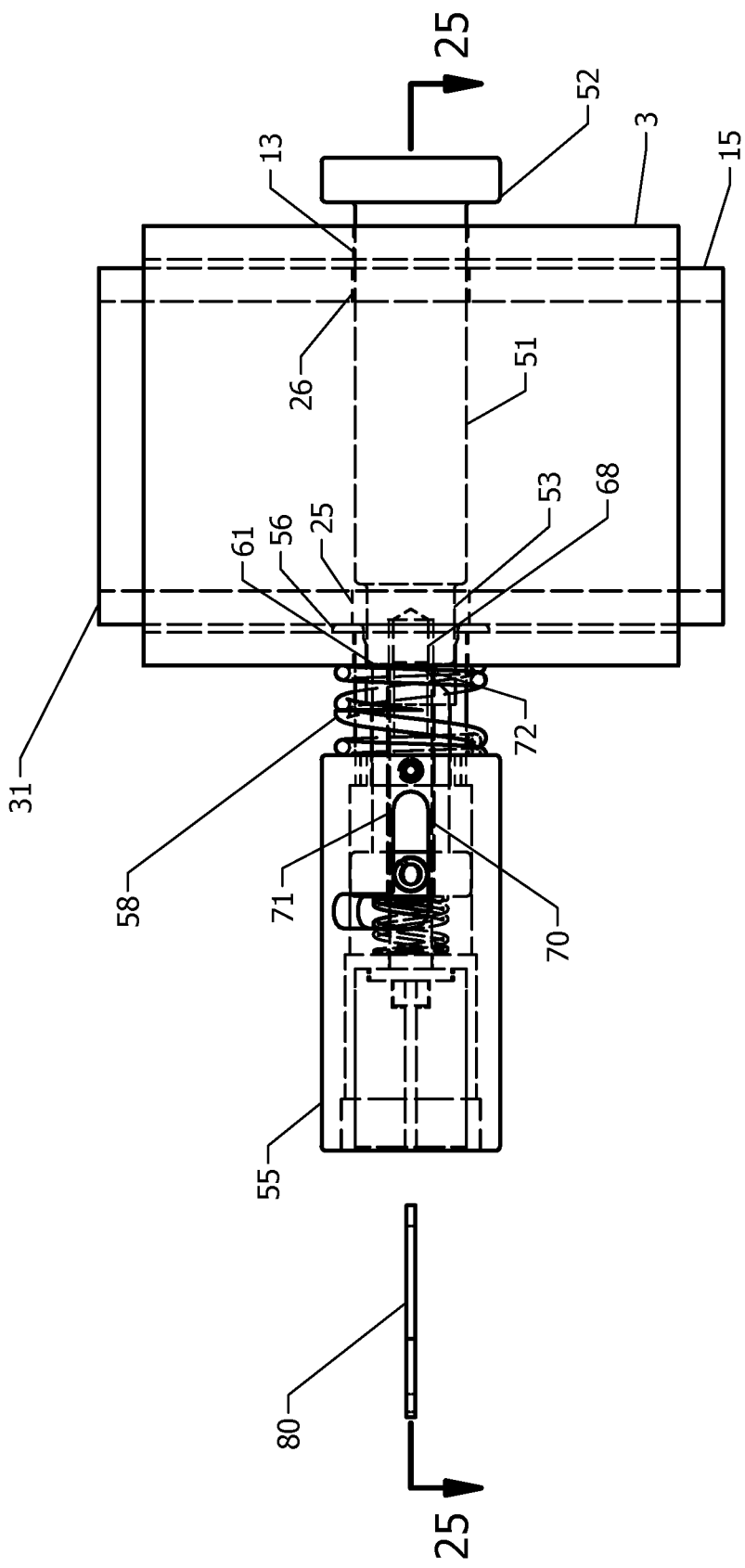
FIG. 18 is an overhead plan view depicting a hitch pin and the housing with plunger of an embodiment of the present invention hitch pin assembly affixed on the first side wall of the receiver tube with the hitch pin inserted into the bushing and the threaded retaining projection making contact with the hollow, internally threaded tip of the hitch pin. A key for threading the projection is shown ready for use to screw the projection into the hitch pin.
Figure 19:
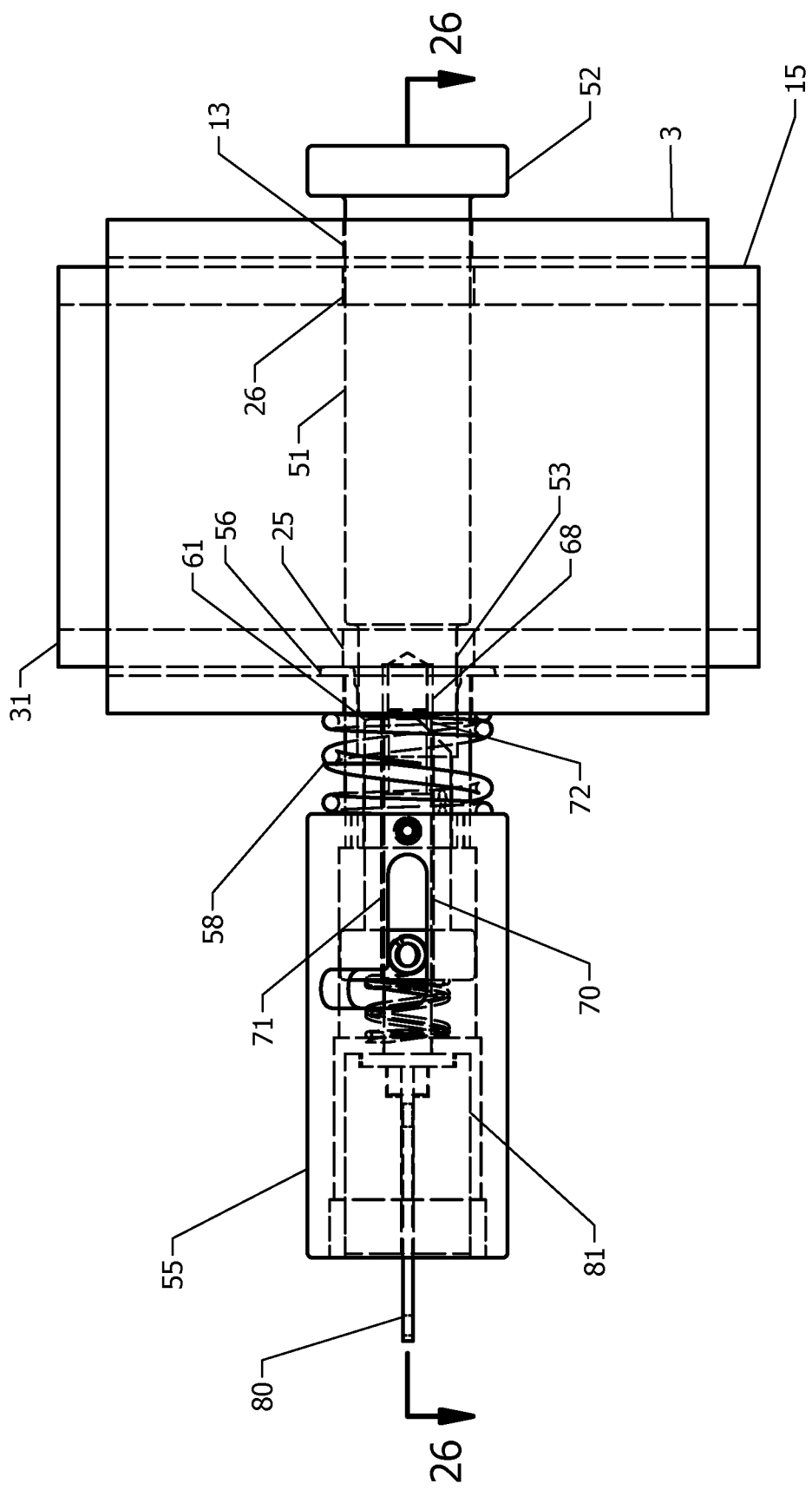
FIG. 19 is an overhead plan view depicting a hitch pin and the housing with plunger of an embodiment of the present invention hitch pin assembly affixed on the first side wall of the receiver tube with the hitch pin inserted into the bushing. The key shown in FIG. 18 has been inserted in a lock in the housing and is turned. The turning motion applied to the key begins threading the projection into the hollow, internally threaded tip of the hitch pin resulting in the drawing of the head of the hitch pin toward the exterior of the second side wall of the receiver tube.
Figure 20:
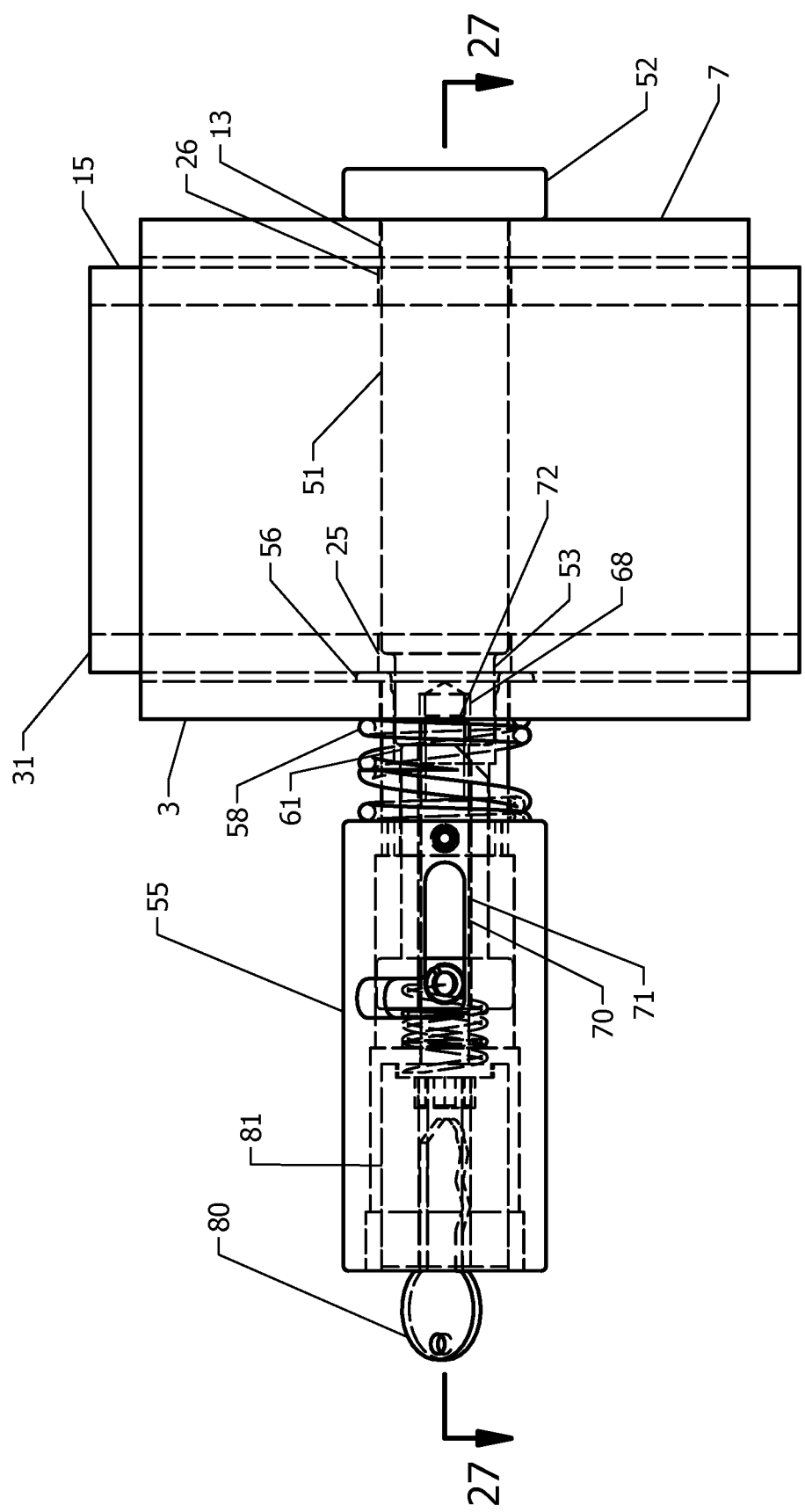
FIG. 20 is an overhead plan view depicting a hitch pin and the housing with plunger of an embodiment of the present invention hitch pin assembly affixed on the first side wall of the receiver tube with the hitch pin inserted into the bushing. The key continues to be wound, further threading the projection into the internally threaded tip of the hitch pin and drawing the head of the hitch pin tight against the second side wall of the receiver tube.
Figure 21:
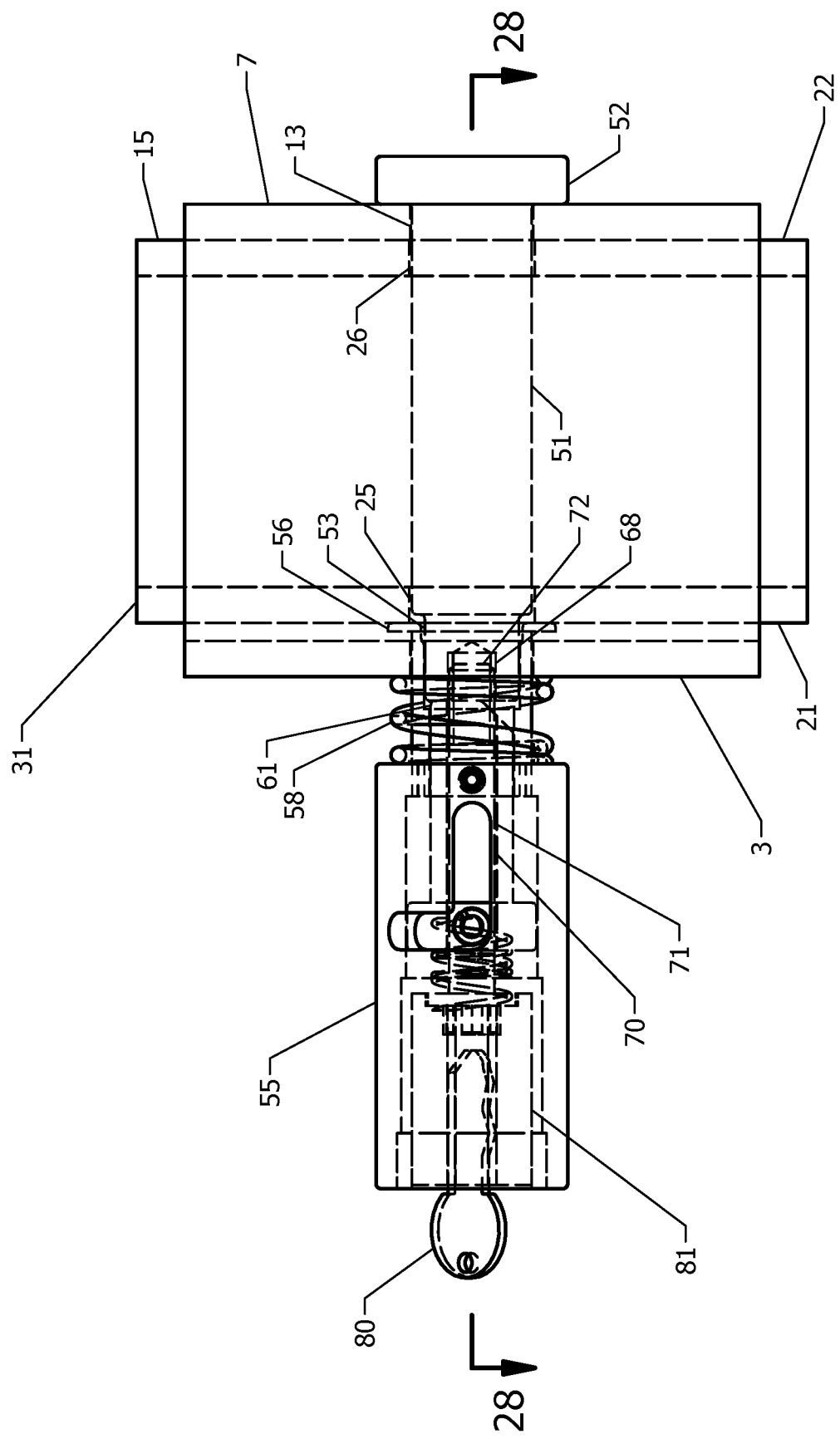
FIG. 21 is an overhead plan view depicting a hitch pin and the housing with plunger of an embodiment of the present invention hitch pin assembly affixed on the first side wall of the receiver tube with the hitch pin inserted into the bushing. The key has been completely turned. The external compression spring is compressed, the head of the hitch pin is pulled tightly against the second side wall of the receiver tube and the shoulder of the bushing is pressed tightly against the first side of the shank, the foregoing structural compressions removing any horizontal transverse play in the adjoined structures.
Figure 22:
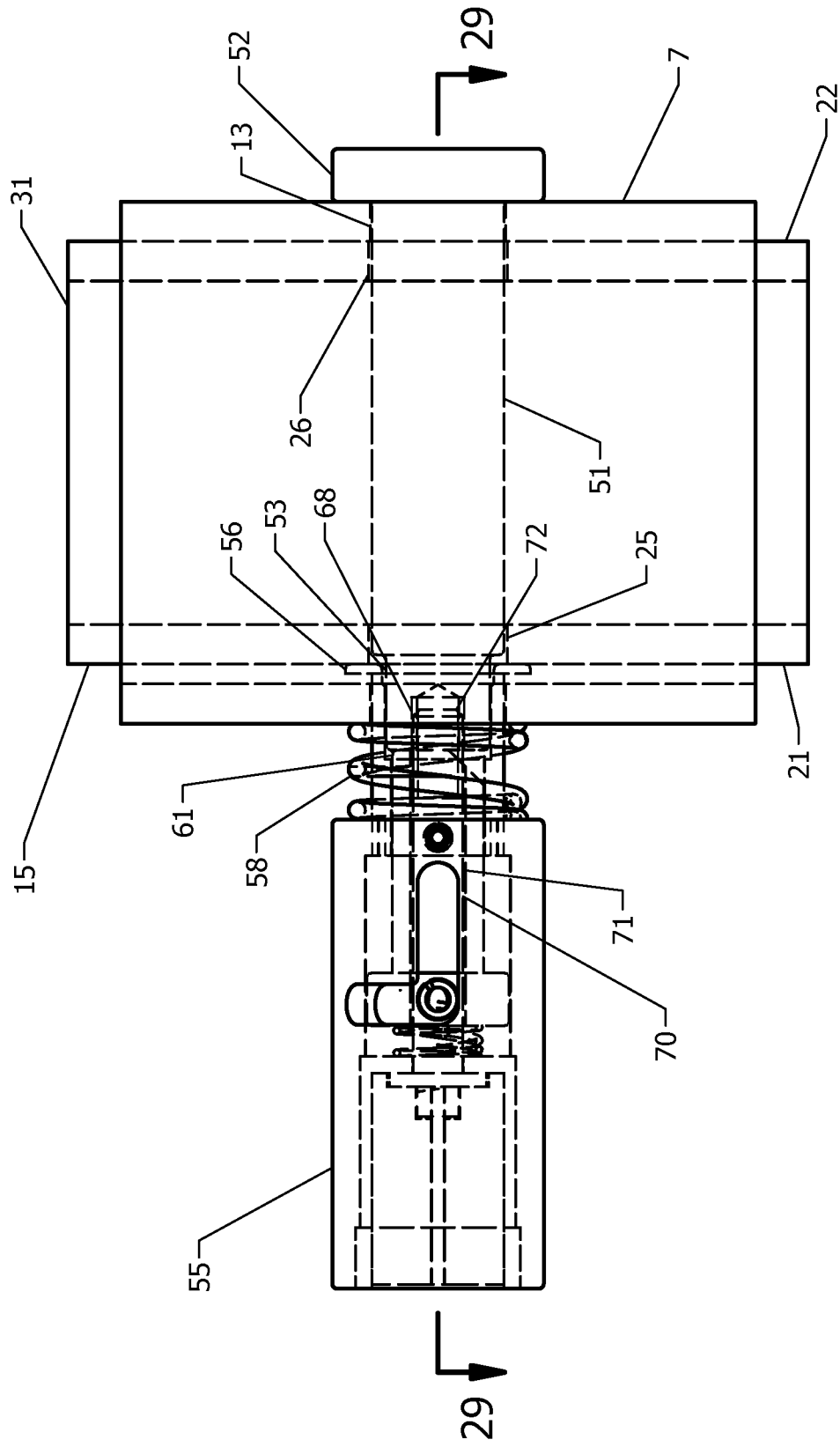
FIG. 22 is an overhead plan view depicting a hitch pin and the housing with plunger of an embodiment of the present invention hitch pin assembly affixed on the first side wall of the receiver tube with the hitch pin inserted into the bushing after the key has been completely wound and removed from the housing, locking the projection into engagement with the hitch pin.
Figure 25:
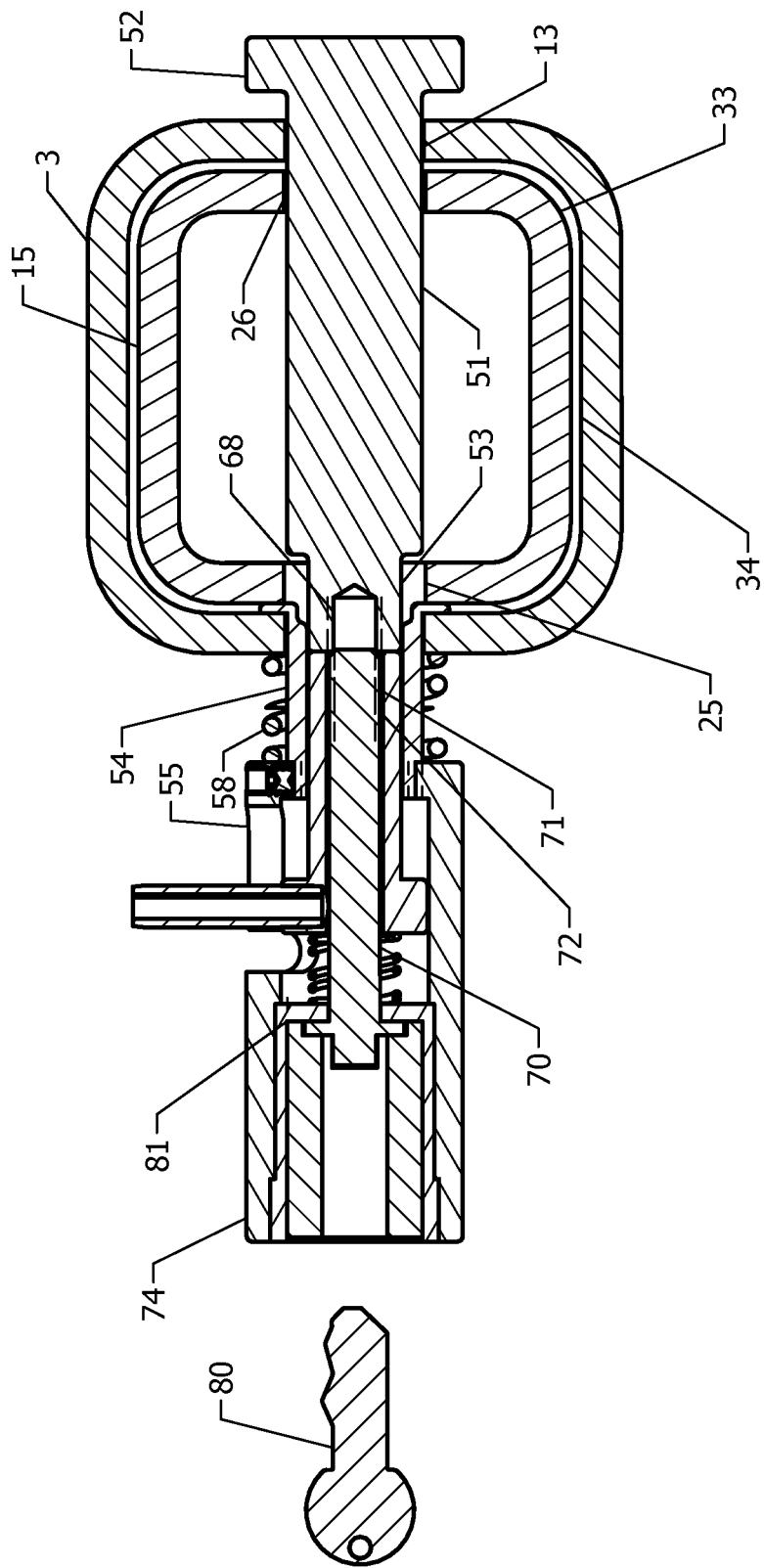
FIG. 25 is an elevation section view taken along line 25-25 of FIG. 18.
Figure 26:
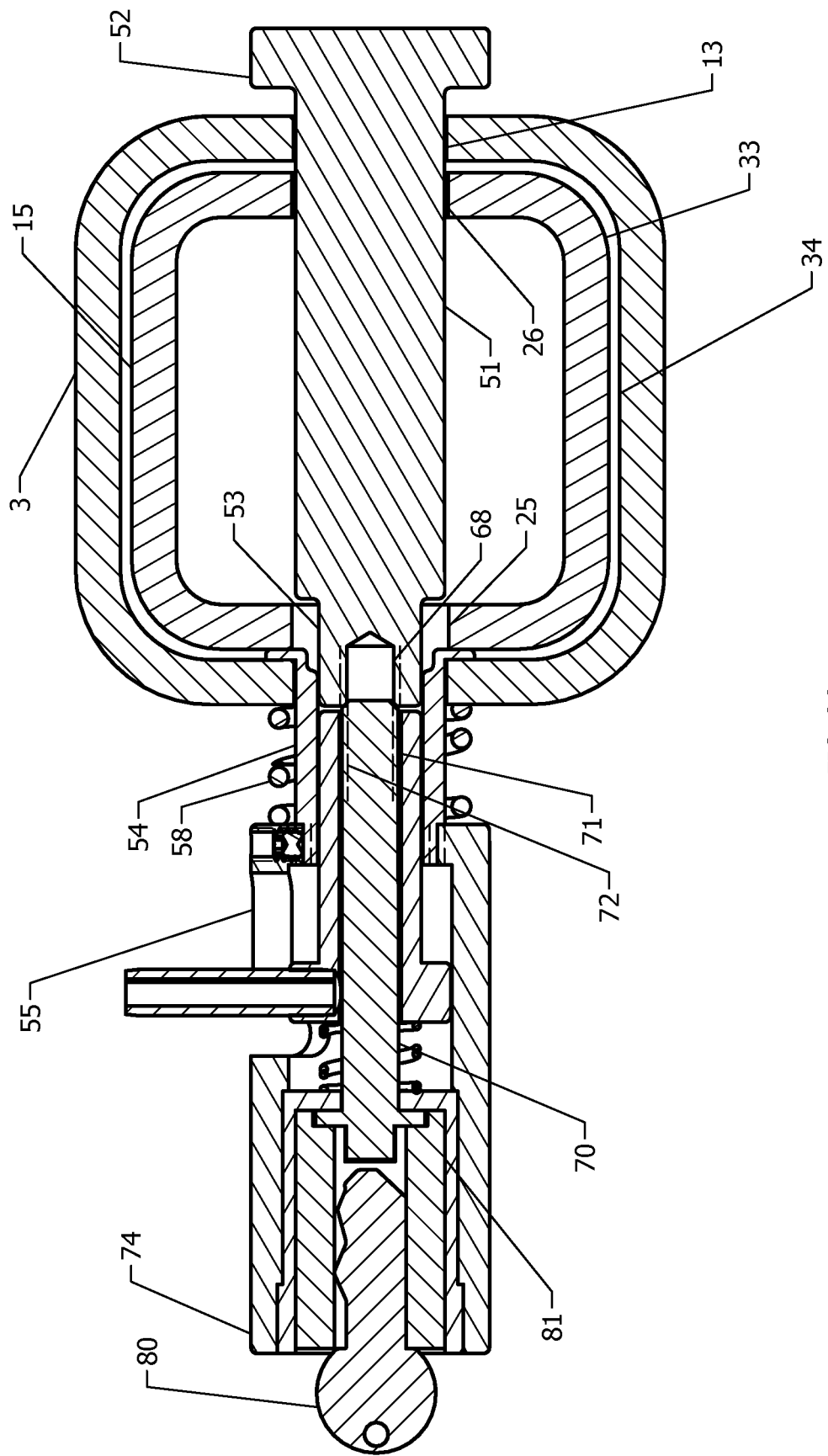
FIG. 26 is an elevation section view taken along line 26-26 of FIG. 19.
Figure 27:
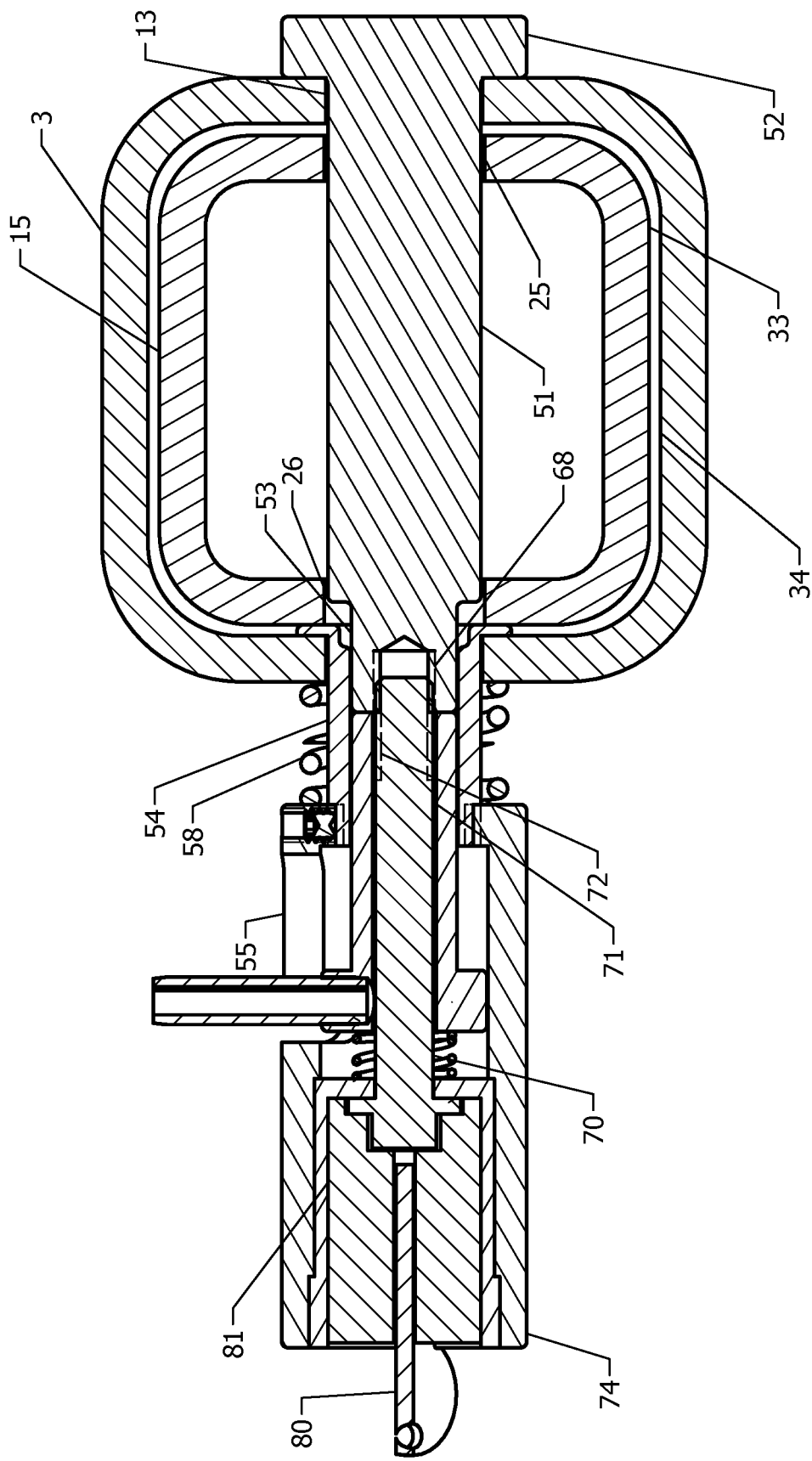
FIG. 27 is an elevation section view taken along line 27-27 of FIG. 20.
Figure 28:
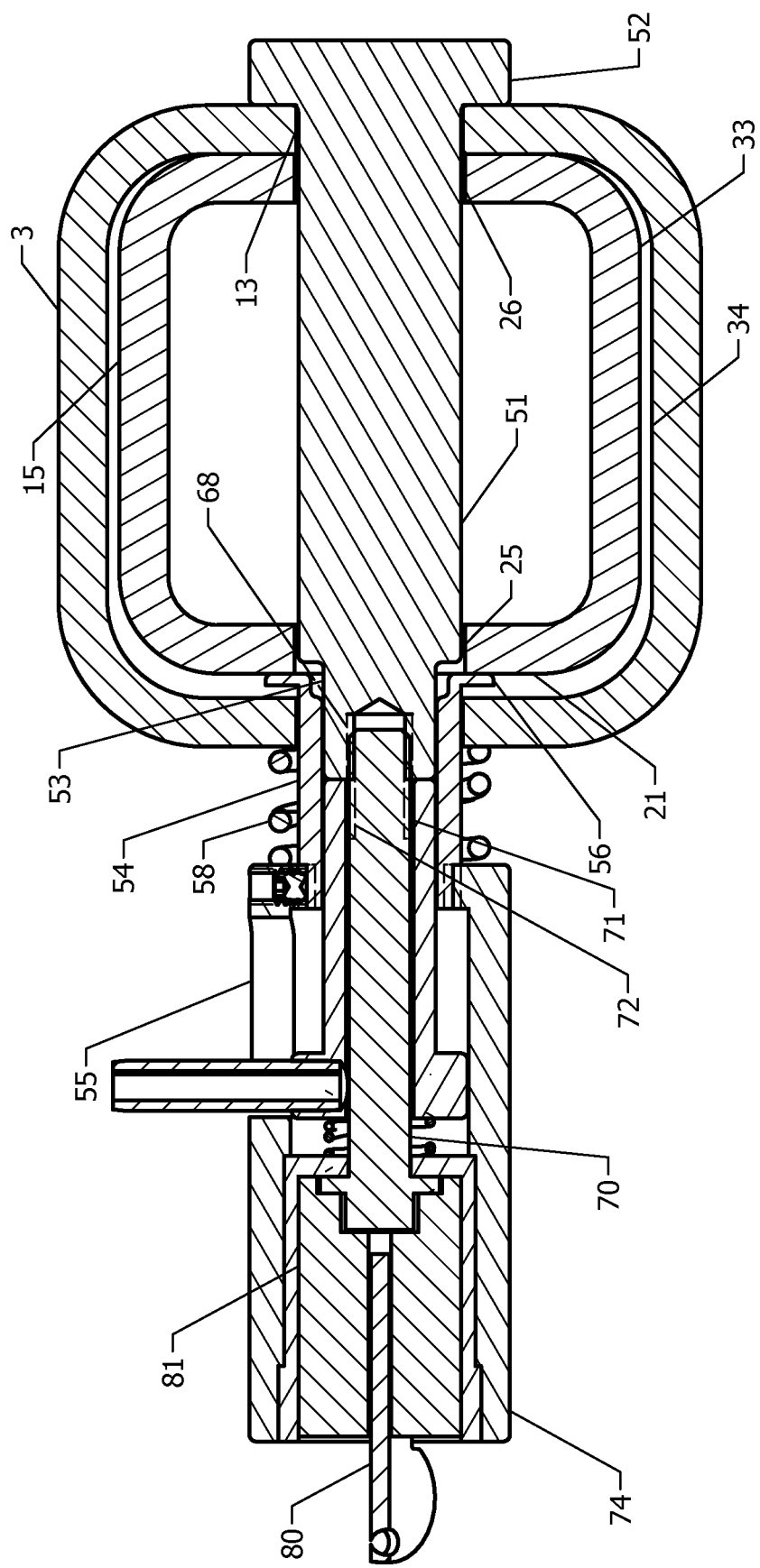
FIG. 28 is an elevation section view taken along line 28-28 of FIG. 21.
Figure 29:
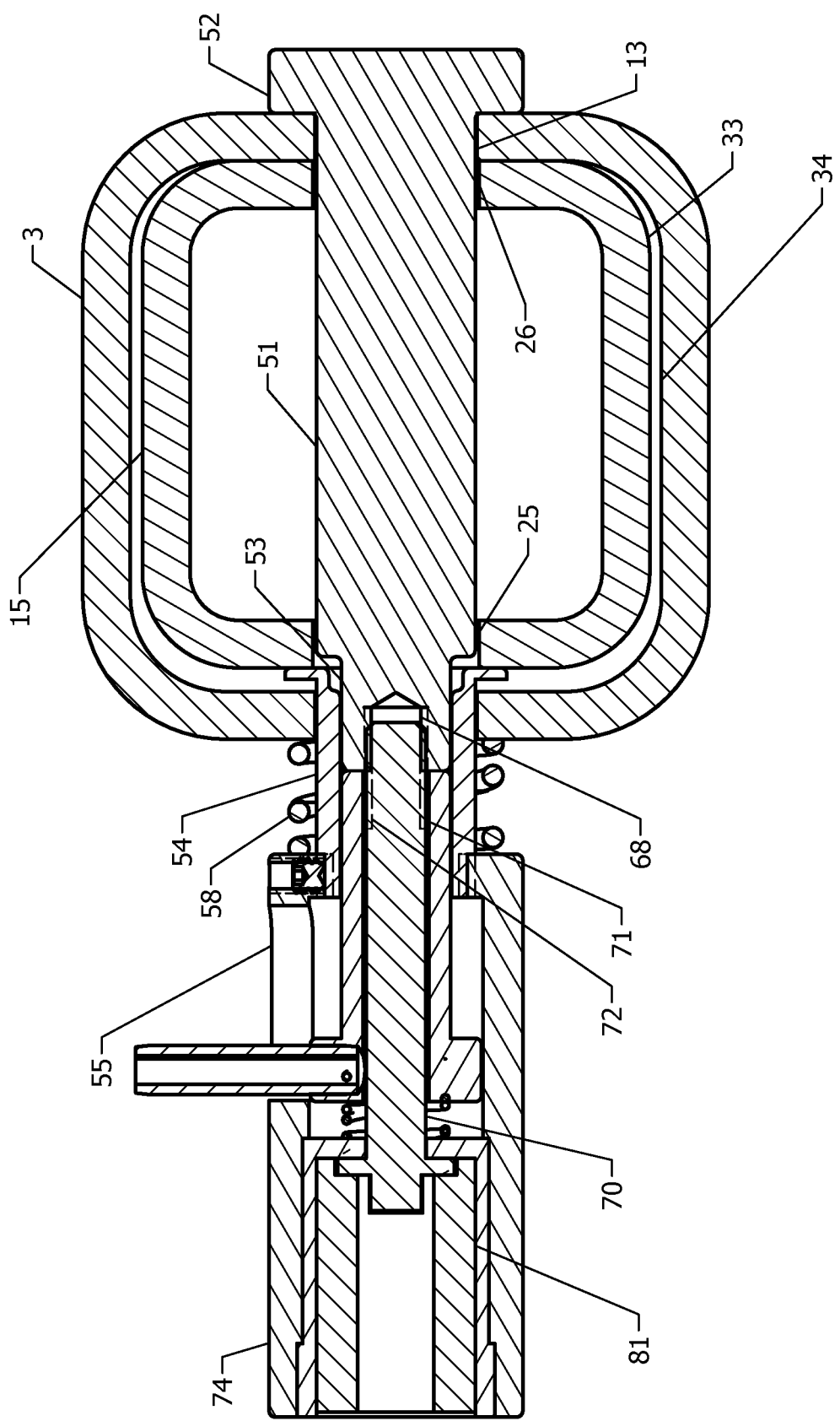
FIG. 29 is an elevation section view taken along line 29-29 of FIG. 22.
Figure 30:
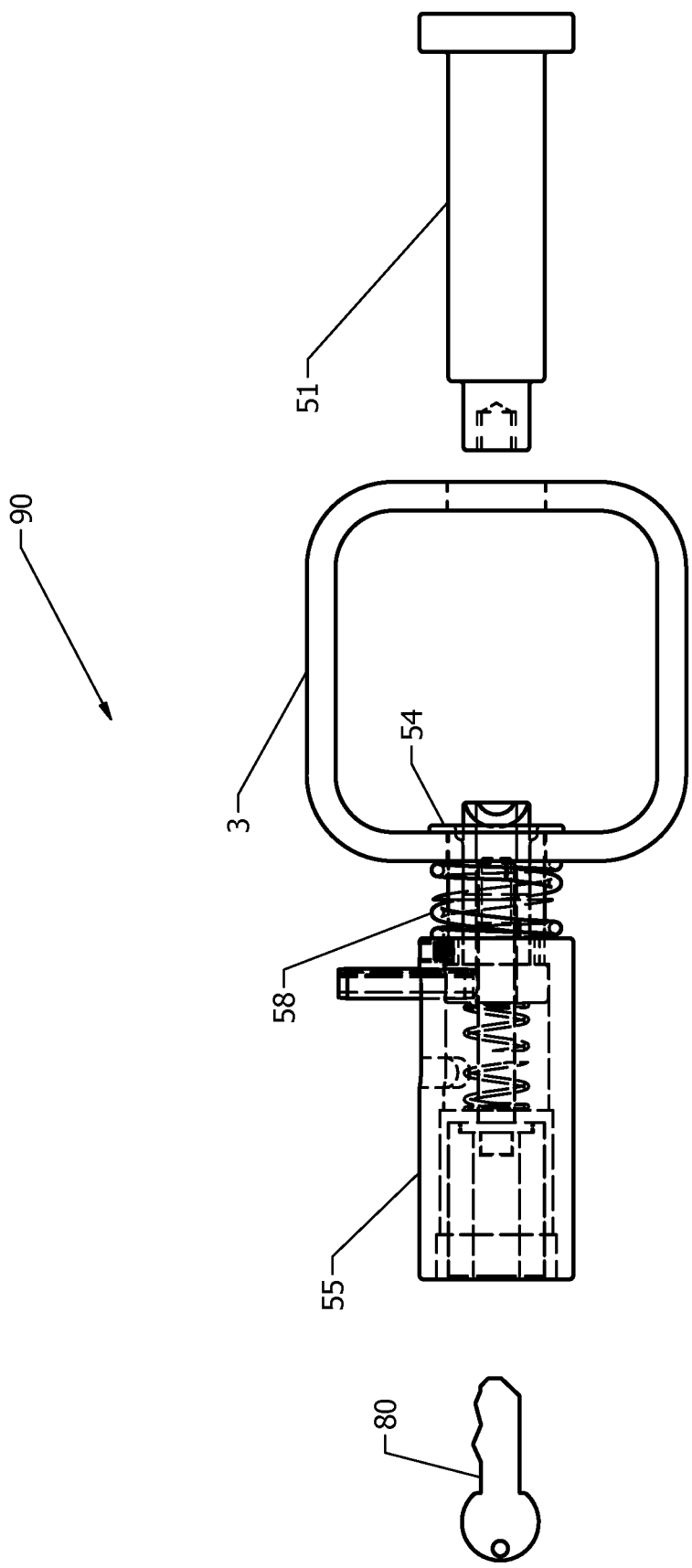
FIG. 30 depicts an embodiment system comprising the described hitch pin assembly and a receiver tube.

In the preferred embodiment, the point at which the internally threaded cavity 68 of hitch pin 51 touches the externally threaded tip 72 of threaded projection 70, threaded projection 70 is rotated via a key 80 that operates lock 81 at outer end 74 of housing 55. FIGS. 18 and 25 depict key 80 ready to be inserted into lock 81 at outer end 74 of housing 55. FIGS. 19 and 26 show key 80 having been inserted into lock 81 to begin the turning motion that will cause the translation of projection 70 into hitch pin tip 53. Key 80 is turned (FIGS. 20-21 and 27-28) until projection 70 is fully threaded into tip 53 of hitch pin 51, at which point key 80 can be removed from lock 81 (FIGS. 22 and 29). As threaded projection 70 threads deeper into internally threaded cavity 68 several important actions occur. The first is that head 52 of hitch pin 51 is pulled tight against exterior surface 10 of second side wall 7 of receiver tube 3. Once this has occurred, external compression spring 58 is compressed, drawing shoulder 56 of shoulder bushing 54 against first side wall 21 of shank 15. Threading of threaded projection 70 into internally threaded cavity 68 continues until second side wall 22 of shank 15 is pressed tightly against the interior surface 34 of second side wall 7 of receiver tube 3. This is seen in FIGS. 20-22 and 27-29. This combined action causes the lateral confinement of shank 15 within interior cavity 5 of receiver tube 3 that restrains shank 15 from horizontal transverse movement that causes noisy rattling.

In a specific preferred embodiment, the invention is directed to a hitch pin assembly 50 for use with a receiver tube 3 with an interior cavity 5 sized and shaped to telescopically receive a shank 15 of an accessory device. As is known in the art, receiver tube 3 and shank 15 each have opposing first apertures 12, 25 and second apertures 13, 26 configurable in an aligned configuration when the receiver tube 3 telescopically receives the shank 15. Hitch pin assembly 50 comprises a hitch pin 51, a housing 55 and a shoulder bushing 54. Hitch pin 51 has a head 52 and a tip 53. Housing 55 removably connects to shoulder bushing 54 when shoulder bushing 54 sits in first aperture 12 of receiver tube 3 to assume a connected configuration.

As shown in the figures, when housing 55 is in the connected configuration: a) spring-loaded plunger 60 of housing 55 extends through a bore 62 of shoulder bushing 54; b) tip 61 of plunger 60 projects into interior cavity 5 of receiver tube 3; and c) upon the first apertures 12, 25 and second apertures 13, 26 assuming the aligned configuration, tip 61 of plunger 60 engages first aperture 25 of shank 15. Hitch pin assembly 50 additionally includes projection 70 upon which plunger 60 translates by virtue of track (bore) 71 in plunger 60. Hitch pin 51 is then inserted first through second apertures 13, 26, then through first apertures 25, 12 and then into bushing 54, whereby it depresses plunger 60 and causes it to recede upon projection 70. When plunger 60 recedes upon projection 70, projection end 72 extends out of plunger 60 and into engageable contact with tip 53 of hitch pin 51. In the preferred embodiment track 71 is a tunnel or bore in plunger 60, but could be any type of guiding structure such as a groove or other structure that guides the translation of plunger 60 on projection 70. As noted, it is preferable that housing 55 and shoulder bushing 54 have complementary threads 63, 76 to achieve the described removable connection between the two.

In addition, it is preferable that projection 70 is externally threaded and tip 53 of hitch pin 51 is internally threaded such that projection 70 engages tip 53 by threading into it. As shown in the figures, housing 55 of hitch pin assembly 50 preferably includes lock 81 that locks projection 70 into engagement with tip 53 of hitch pin 51.

In another preferred embodiment, the invention is directed to a system for connecting an accessory device to a motor vehicle. As is known in the art, the accessory device has a shank 15 with opposing first and second opposing apertures 25, 26. The system comprises a receiver tube 3 with an interior cavity 5 sized and shaped to telescopically receive shank 15. Receiver tube 3 has first and second opposing apertures 12, 13. Those apertures 12, 13 are configurable with apertures 25, 26 of shank 15 in an aligned configuration when receiver tube 3 telescopically receives shank 15.

The system further includes hitch pin assembly 50 comprising hitch pin 51, shoulder bushing 54 and housing 55. Hitch pin 51 has head 52 and tip 53. Housing 55 is removably connectable to shoulder bushing 54 to assume a connected configuration when shoulder bushing 54 is seated in first aperture 12 of receiver tube 3. When housing 55 is in the connected configuration: a) spring-loaded plunger 60 of housing 55 extends through bore 62 of shoulder bushing 54; b) tip 61 of plunger 60 projects into interior cavity 5 of receiver tube 3; and c) upon first and second apertures 12, 13, 25, 26 assuming the aligned configuration, tip 61 of plunger 60 engages first aperture 25 of shank 15. The system includes projection 70 upon which plunger 60 translates via track 71 and engages tip 53 of hitch pin 51 when hitch pin 51 is inserted through aligned first and second apertures 12, 13, 25, 26 and into bushing 54. The foregoing system preferably includes the other preferred embodiment features of the embodiment hitch pin assembly 50 described above.

The invention is further directed to an embodiment method for connecting the shank of an accessory device to a receiver tube as above-described. The method comprises providing: a hitch pin 51, a shoulder bushing 54 and a housing 55. Hitch pin 51 has head 52 and hitch pin tip 53. Housing 55 has a spring-loaded plunger 60. Spring-loaded plunger 60 has plunger tip 61. Shoulder bushing 54 is inserted into interior cavity 5 and then through first aperture 12 of receiver tube 3. Housing 55 is then removably connected to shoulder bushing 54 in a manner in which it is biased away from sidewall 6 of receiver tube 3. Upon the biasing connection of housing 55 to bushing 54, plunger 60 extends through bore 62 of shoulder bushing 54 such that plunger tip 61 projects into interior cavity 5 of receiver tube 3.

Shank 15 is then telescopically slid into interior cavity 5 until first and second apertures 12, 13, 25, 26 of receiver tube 3 and shank 15 assume the aligned configuration. When this occurs plunger tip 61 engages first aperture 25 of shank 15. Hitch pin 51 is then inserted through aligned first and second apertures 12, 13, 25, 26 of receiver tube 3 and shank 15, into bushing 54 and depresses plunger 60. Plunger 60 translates along projection 70 via track 71 of plunger 60 until hitch pin tip 53 contacts tip 72 of projection 70. Whereupon, projection 70 can be turned into threaded engagement with hitch pin tip 53. With the described method it is preferable that the action of removably connecting housing 55 to shoulder bushing 54 includes threading housing 55 onto bushing 54 using external spring 58 to bias housing 55 away from first side wall 6. Additionally, it is preferable that the action of engaging tip 53 of hitch pin 51 with projection 70 includes threading projection 70 into tip 53 of hitch pin 51. It is also preferable that the method include the action of locking projection 70 into engagement with tip 53 of hitch pin 51 once they are fully engaged. The action of locking projection 70 into engagement with hitch pin 51 is preferably effected by lock 81 housed in housing 55. It is also preferable that the action of translating projection 70 into engagement with tip 53 of hitch pin 51 is caused by the turning of key 80 inserted into lock 81.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A hitch pin assembly for use with a receiver tube with an interior cavity sized and shaped to telescopically receive a shank of an accessory device, the receiver tube and shank each having opposing first and second apertures configurable in an aligned configuration when the receiver tube telescopically receives the shank, the hitch pin assembly comprising:
   a hitch pin, a housing and a shoulder bushing;
   the hitch pin having a head and a tip;
   the housing including a spring-loaded plunger movable upon a projection within a track of the plunger;
   the housing assuming a connected configuration when it is removably connected to the shoulder bushing when the shoulder bushing is seated in the first aperture of the receiver tube;
   wherein when the housing is in the connected configuration; a) the plunger extends through the shoulder bushing; b) a tip of the plunger projects into the interior cavity of the receiver tube; and c) upon the first and second apertures of the receiver tube and shank assuming the aligned configuration the tip of the plunger engages the first aperture of the shank;
   wherein when the housing is in the connected configuration, the first and second apertures are in the aligned configuration and the hitch pin is inserted through the second aperture of the receiver tube and into the shoulder bushing so as to depress the plunger, the tip of the hitch pin is engageable with the projection; and
   wherein the housing and shoulder bushing have complementary threads and the housing removably connects to the shoulder bushing by threading on to it.

2. The hitch pin assembly of claim 1 wherein when, the projection is brought into engagement with the tip of the hitch pin, the shank is restrained from horizontal transverse movement within the interior cavity of the receiver tube.

3. A hitch pin assembly for use with a receiver tube with an interior cavity sized and shaped to telescopically receive a shank of an accessory device, the receiver tube and shank each having opposing first and second apertures configurable in an aligned configuration when the receiver tube telescopically receives the shank, the hitch pin assembly comprising:
   a hitch pin, a housing and a shoulder bushing;
   the hitch pin having a head and a tip;
   the housing including a spring-loaded plunger movable upon a projection within a track of the plunger;
   the housing assuming a connected configuration when it is removably connected to the shoulder bushing when the shoulder bushing is seated in the first aperture of the receiver tube;
   wherein when the housing is in the connected configuration; a) the plunger extends through the shoulder bushing; b) a tip of the plunger projects into the interior cavity of the receiver tube; and c) upon the first and second apertures of the receiver tube and shank assuming the aligned configuration the tip of the plunger engages the first aperture of the shank;
   wherein when the housing is in the connected configuration, the first and second apertures are in the aligned configuration and the hitch pin is inserted through the second aperture of the receiver tube and into the shoulder bushing so as to depress the plunger, the tip of the hitch pin is engageable with the projection; and
   wherein the projection is externally threaded and the tip of the hitch pin is internally threaded and the projection engages the tip of the hitch pin by threading into it.

4. A hitch pin assembly for use with a receiver tube with an interior cavity sized and shaped to telescopically receive a shank of an accessory device, the receiver tube and shank each having opposing first and second apertures configurable in an aligned configuration when the receiver tube telescopically receives the shank, the hitch pin assembly comprising:
   a hitch pin, a housing and a shoulder bushing;
   the hitch pin having a head and a tip;
   the housing including a spring-loaded plunger movable upon a projection within a track of the plunger;

the housing assuming a connected configuration when it is removably connected to the shoulder bushing when the shoulder bushing is seated in the first aperture of the receiver tube;

wherein when the housing is in the connected configuration; a) the plunger extends through the shoulder bushing; b) a tip of the plunger projects into the interior cavity of the receiver tube; and c) upon the first and second apertures of the receiver tube and shank assuming the aligned configuration the tip of the plunger engages the first aperture of the shank;

wherein when the housing is in the connected configuration, the first and second apertures are in the aligned configuration and the hitch pin is inserted through the second aperture of the receiver tube and into the shoulder bushing so as to depress the plunger, the tip of the hitch pin is engageable with the projection; and wherein the housing includes a lock that locks the projection into engagement with the tip of the hitch pin.

5. The hitch pin assembly of claim 4 wherein the lock is key activated and the action of turning the key causes the projection to engage the tip of the hitch pin.

6. A system for connecting an accessory device to a motor vehicle, the accessory device having a shank with opposing first and second apertures, the system comprising:

a receiver tube with an interior cavity sized and shaped to telescopically receive the shank, the receiver tube having first and second apertures, the first and second apertures of the receiver tube configurable in an aligned configuration with the first and second apertures of the shank when the receiver tube telescopically receives the shank;

a hitch pin, a housing and a shoulder bushing;

the hitch pin having a head and tip;

the housing including a spring-loaded plunger movable upon a projection within a track of the plunger;

the housing assuming a connected configuration when it is removably connected to the shoulder bushing when the shoulder bushing is seated in the first aperture of the receiver tube;

wherein when the housing is in the connected configuration; a) the plunger extends through the shoulder bushing; b) a tip of the plunger projects into the interior cavity of the receiver tube; and c) upon the first and second apertures of the receiver tube and shank assuming the aligned configuration the tip of the plunger engages the first aperture of the shank;

wherein when the housing is in the connected configuration, the first and second apertures are in the aligned configuration and the hitch pin is inserted through the second aperture of the receiver tube and into the bushing so as to depress the plunger, the tip of the hitch pin is engageable with the projection; and wherein the housing and shoulder bushing have complementary threads and the housing removably connects to the shoulder bushing by threading on to it.

7. The system of claim 6 wherein when, the projection is brought into engagement with the tip of the hitch pin, the shank is restrained from horizontal transverse movement within the interior cavity of the receiver tube.

8. A system for connecting an accessory device to a motor vehicle, the accessory device having a shank with opposing first and second apertures, the system comprising:

a receiver tube with an interior cavity sized and shaped to telescopically receive the shank, the receiver tube having first and second apertures, the first and second apertures of the receiver tube configurable in an aligned configuration with the first and second apertures of the shank when the receiver tube telescopically receives the shank;

a hitch pin, a housing and a shoulder bushing;

the hitch pin having a head and tip;

the housing including a spring-loaded plunger movable upon a projection within a track of the plunger;

the housing assuming a connected configuration when it is removably connected to the shoulder bushing when the shoulder bushing is seated in the first aperture of the receiver tube;

wherein when the housing is in the connected configuration; a) the plunger extends through the shoulder bushing; b) a tip of the plunger projects into the interior cavity of the receiver tube; and c) upon the first and second apertures of the receiver tube and shank assuming the aligned configuration the tip of the plunger engages the first aperture of the shank;

wherein when the housing is in the connected configuration, the first and second apertures are in the aligned configuration and the hitch pin is inserted through the second aperture of the receiver tube and into the bushing so as to depress the plunger, the tip of the hitch pin is engageable with the projection; and wherein the projection is externally threaded and the tip of the hitch pin is internally threaded and the projection engages the tip of the hitch pin by threading into it.

9. A system for connecting an accessory device to a motor vehicle, the accessory device having a shank with opposing first and second apertures, the system comprising:

a receiver tube with an interior cavity sized and shaped to telescopically receive the shank, the receiver tube having first and second apertures, the first and second apertures of the receiver tube configurable in an aligned configuration with the first and second apertures of the shank when the receiver tube telescopically receives the shank;

a hitch pin, a housing and a shoulder bushing;

the hitch pin having a head and tip;

the housing including a spring-loaded plunger movable upon a projection within a track of the plunger;

the housing assuming a connected configuration when it is removably connected to the shoulder bushing when the shoulder bushing is seated in the first aperture of the receiver tube;

wherein when the housing is in the connected configuration; a) the plunger extends through the shoulder bushing; b) a tip of the plunger projects into the interior cavity of the receiver tube; and c) upon the first and second apertures of the receiver tube and shank assuming the aligned configuration the tip of the plunger engages the first aperture of the shank;

wherein when the housing is in the connected configuration, the first and second apertures are in the aligned configuration and the hitch pin is inserted through the second aperture of the receiver tube and into the bushing so as to depress the plunger, the tip of the hitch pin is engageable with the projection; and wherein the housing includes a lock that locks the projection into engagement with the tip of the hitch pin.

10. The system of claim 9 wherein the lock is key activated and the action of turning the key causes the projection to engage the tip of the hitch pin.

11. A method of connecting a shank of an accessory device to a receiver tube, the receiver tube having an interior cavity sized and shaped to telescopically receive the shank, the receiver tube and shank each having opposing first and second apertures configurable in an aligned configuration when the receiver tube telescopically receives the shank, the method comprising:
a) providing:
a hitch pin having a head and a hitch pin tip;
a shoulder bushing;
a housing having a spring-loaded plunger, the spring-loaded plunger having a plunger tip and movable along a projection within the plunger;
b) inserting the shoulder bushing into the interior cavity and then through the first aperture of the receiver tube;
c) removably connecting the housing to the shoulder bushing,
d) extending the plunger through the shoulder bushing such that the plunger tip projects into the interior cavity of the receiver tube;
e) sliding the shank into the interior cavity until the first and second apertures of the receiver tube and shank assume the aligned configuration and the plunger tip engages the first aperture of the shank;
f) inserting the hitch pin through the first and second apertures of the receiver tube and shank and into the bushing so as to depress the plunger tip and cause the projection to contact the hitch pin tip;
g) engaging the projection with the hitch pin tip; and
wherein the action of removably connecting the housing to the shoulder bushing includes threading the housing onto the bushing.

12. The method of claim 11 wherein the action of engaging the projection with the hitch pin tip restrains the shank from horizontal transverse movement within the interior cavity of the receiver tube.

13. A method of connecting a shank of an accessory device to a receiver tube, the receiver tube having an interior cavity sized and shaped to telescopically receive the shank, the receiver tube and shank each having opposing first and second apertures configurable in an aligned configuration when the receiver tube telescopically receives the shank, the method comprising:
a) providing:
a hitch pin having a head and a hitch pin tip;
a shoulder bushing;
a housing having a spring-loaded plunger, the spring-loaded plunger having a plunger tip and movable along a projection within the plunger;
b) inserting the shoulder bushing into the interior cavity and then through the first aperture of the receiver tube;
c) removably connecting the housing to the shoulder bushing,
d) extending the plunger through the shoulder bushing such that the plunger tip projects into the interior cavity of the receiver tube;
e) sliding the shank into the interior cavity until the first and second apertures of the receiver tube and shank assume the aligned configuration and the plunger tip engages the first aperture of the shank;
f) inserting the hitch pin through the first and second apertures of the receiver tube and shank and into the bushing so as to depress the plunger tip and cause the projection to contact the hitch pin tip;
g) engaging the projection with the hitch pin tip; and
wherein the action of engaging the hitch pin tip with the projection includes threading the projection into the hitch pin tip.

14. A method of connecting the shank of an accessory device to a receiver tube, the receiver tube having an interior cavity sized and shaped to telescopically receive the shank, the receiver tube and shank each having opposing first and second apertures configurable in an aligned configuration when the receiver tube telescopically receives the shank, the method comprising:
a) providing:
a hitch pin having a head and a hitch pin tip;
a shoulder bushing;
a housing having a spring-loaded plunger, the spring-loaded plunger having a plunger tip and movable along a projection within the plunger;
b) inserting the shoulder bushing into the interior cavity and then through the first aperture of the receiver tube;
c) removably connecting the housing to the shoulder bushing,
d) extending the plunger through the shoulder bushing such that the plunger tip projects into the interior cavity of the receiver tube;
e) sliding the shank into the interior cavity until the first and second apertures of the receiver tube and shank assume the aligned configuration and the plunger tip engages the first aperture of the shank;
f) inserting the hitch pin through the first and second apertures of the receiver tube and shank and into the bushing so as to depress the plunger tip and cause the projection to contact the hitch pin tip;
g) engaging the projection with the hitch pin tip; and
further including locking the projection into engagement with the hitch pin tip.

15. The method of claim 14 wherein the action of locking the projection into engagement with the hitch pin tip is effected by a lock housed in the housing.

16. The method of claim 15 wherein the action of engaging the hitch pin tip with the projection is caused by turning of a key inserted into the lock.

* * * * *